(12) United States Patent
Khabbaz et al.

(10) Patent No.: US 10,261,523 B2
(45) Date of Patent: Apr. 16, 2019

(54) APPARATUS AND METHOD FOR CONTROLLING IRRIGATION PROCESS BY SENDING ENCODED ACOUSTICAL MESSAGES ALONG IRRIGATION CONDUIT

(71) Applicant: Rainboxx, Inc., Austin, TX (US)

(72) Inventors: Alex Khabbaz, Austin, TX (US); Steve Cratus Owens, Barrington, NH (US); Michael Varanka, Amherst, NH (US)

(73) Assignee: Rainboxx, Inc., Austin, TX (US)

( * ) Notice: Subject to any disclaimer, the term of this patent is extended or adjusted under 35 U.S.C. 154(b) by 368 days.

(21) Appl. No.: 15/193,379

(22) Filed: Jun. 27, 2016

(65) Prior Publication Data

US 2017/0049061 A1   Feb. 23, 2017

Related U.S. Application Data

(63) Continuation-in-part of application No. 15/170,651, filed on Jun. 1, 2016, and a continuation-in-part of application No. 15/074,158, filed on Mar. 18, 2016, now abandoned.

(60) Provisional application No. 62/205,927, filed on Aug. 17, 2015.

(51) Int. Cl.
*G05D 7/06* (2006.01)
*A01G 25/16* (2006.01)

(52) U.S. Cl.
CPC ......... *G05D 7/0664* (2013.01); *A01G 25/162* (2013.01)

(58) Field of Classification Search
CPC ........................... G05D 7/0664; A01G 25/162

USPC ...................................................... 239/63–71
See application file for complete search history.

(56) References Cited

U.S. PATENT DOCUMENTS

| 3,420,270 A | 1/1969 | Neyer |
| 3,519,016 A | 7/1970 | Kah, Jr. et al. |
| 3,747,620 A | 7/1973 | Kah, Jr. |
| 3,797,740 A | 3/1974 | Kah, Jr. |
| 3,853,145 A | 12/1974 | Judd |
| 4,407,451 A | 10/1983 | Hunter |

(Continued)

FOREIGN PATENT DOCUMENTS

CN     104686297 A    6/2015

*Primary Examiner* — Darren W Gorman
*Assistant Examiner* — Qingzhang Zhou
(74) *Attorney, Agent, or Firm* — Davis & Bujold PLLC; Michael J. Bujold

(57) ABSTRACT

A latching solenoid slave valve for wirelessly receiving watering instructions from an irrigation controller via acoustical waves or pulses. The latching solenoid slave valve comprises a diaphragm in direct communication with a main water distribution conduit of the irrigation system for detecting acoustical waves or pulses transmitted by pressurized water of the main water distribution conduit. An accelerometer is supported by the diaphragm for generating an output signal as the diaphragm vibrates due to detection of the acoustical waves or pulses. A microcontroller is electrically coupled to the accelerometer for processing the output signals of the accelerometer, and the microcontroller determining, from the processed output signals of the accelerometer, whether or not the latching solenoid slave valve is to commence a watering cycle for a desired duration of time. An irrigation controller is wirelessly coupled to the latching solenoid slave valve for controlling operation thereof.

15 Claims, 14 Drawing Sheets

(56) References Cited

U.S. PATENT DOCUMENTS

| | | | | |
|---|---|---|---|---|
| 5,040,409 | A | * | 8/1991 | Kiewit .................. G08B 21/18 340/605 |
| 5,878,953 | A | | 3/1999 | Coffman |
| 6,267,298 | B1 | | 7/2001 | Campbell |
| 6,622,933 | B1 | | 9/2003 | Young et al. |
| 6,652,188 | B1 | * | 11/2003 | Albright .............. A01G 25/167 405/37 |
| 7,383,721 | B2 | | 6/2008 | Parsons et al. |
| 7,822,511 | B2 | * | 10/2010 | Ivans ..................... A01G 25/16 137/78.3 |
| 8,397,745 | B2 | | 3/2013 | Hurst |
| 2002/0179148 | A1 | * | 12/2002 | Lull .................. G05D 7/0664 137/487.5 |
| 2006/0202051 | A1 | | 9/2006 | Parsons et al. |
| 2009/0001193 | A1 | * | 1/2009 | Parsons ................. A01G 25/16 239/69 |
| 2012/0043395 | A1 | * | 2/2012 | Hill ...................... B05B 12/008 239/69 |
| 2013/0320250 | A1 | | 12/2013 | Graham et al. |
| 2014/0339333 | A1 | * | 11/2014 | Wright, III ............. B05B 12/12 239/204 |

\* cited by examiner

APPARATUS AND METHOD FOR CONTROLLING IRRIGATION PROCESS BY SENDING ENCODED ACOUSTICAL MESSAGES ALONG IRRIGATION CONDUIT

TECHNICAL FIELD OF THE INVENTION

The present invention relates to irrigation systems in which the one or more irrigation zones are controlled by pressure pulse signals which are communicated directly through the irrigation water contained within the conduits of the irrigation system.

BACKGROUND OF THE INVENTION

Irrigations systems have been designed around the concept of a control box or a controller and a valve box. The control box or a controller turns "on" and "off" each of the solenoid valves in the valve box at desired time intervals. The input of each valve is connected to the water supply line. The output of each valve is connected to downstream pipes or conduits that meander or run through the corresponding irrigation zone.

Most systems must utilize a plurality of (slave) valves in which each (slave) valve controls a separate watering zone that has a plurality of sprinkler heads located along a conduit which extends within the respective watering zones. Due to the frictional flow losses within the distribution pipe or conduit that restrict the volume of water that can be delivered, if all the sprinkler heads were activated at the same time (i.e., simultaneously supplied with water pressure), the delivered water pressure for each sprinkler head would vary accordingly. That is, the frictional flow losses would cause the delivered water pressure for the downstream sprinkler heads to generally be insufficient. Thus, the sprinkler system would fail to operate as designed, e.g., the associated sprinkler heads would insufficiently water all of the designated areas to be watered.

In an attempt to address this, systems were designed having a plurality of slave valves, in which each slave valve controls a plurality of sprinkler heads of a respective watering zone. However, in order to provides such control, each slave valve needs electronic wiring and thus, each slave valve cannot efficiently be located near each respective zone. However, since the (slave) valve must be located proximate to the controller, a large amount of additional trenches and distribution pipe or conduit must be installed in order to complete the irrigation system. The Inventors noted that if the valves could be mounted remotely or adjacent the watering zone, a substantial amount of trenching and distribution pipe or conduit could be saved thereby reduce overall cost of install for an irrigation system.

In addition, the Inventors also noted that if the plurality of (slave) valves were able to communicate with the main controller in a wireless fashion, this would minimize the electrical wiring required for installation of an irrigation system and further reduce the overall cost of installing an irrigation system.

SUMMARY OF THE INVENTION

Wherefore, it is an object of the present invention to overcome the above mentioned shortcomings and drawbacks associated with the prior art.

An object of the present invention is to provide a plurality of remotely located latching solenoid slave valves, for an irrigation system, in which operation of each latching solenoid slave valve is controlled by a single main irrigation controller, located at a distance away from each one of the latching solenoid slave valves, by acoustical waves or pulses which are transmitted through the pressurized water contained within a main water supply conduit of the irrigation system.

Another object of the present invention is to communicate operating instructions to latching solenoid slave valves, via a series of acoustical waves or pulses, indicating which one of the plurality of latching solenoid slave valves is to commence a desired watering cycle.

Still another object of the present invention is to utilize the spacing time, between the series of acoustical waves or pulses, to instruct which one of the plurality of latching solenoid slave valves is to commence operation and also to instruct the desired duration of the watering cycle of each of the plurality of latching solenoid slave valves.

Yet another object of the present invention is to couple a pulser valve, directly vented to the atmosphere, to the irrigation controller so that when the irrigation controller issues a command instructing the pulser valve to "open," water temporarily flows out through the pulser valve thereby resulting in a pressure drop which creates an acoustical wave or pulse in the water contained within the main water distribution conduit.

The present invention relates to an irrigation system for wirelessly sending encoded acoustical messages in a main water distribution conduit for controlling the irrigation processes, the irrigation system comprising an acoustical generator, an irrigation controller, and an acoustical receiver.

The present invention also relates to a latching solenoid slave valve which wirelessly receives watering instructions from an irrigation controller via acoustical waves or pulses, the latching solenoid slave valve comprising a diaphragm in direct communication with a main water distribution conduit of the irrigation system for detecting acoustical waves or pulses transmitted by pressurized water when contained within the main water distribution conduit; an accelerometer being supported by an opposite surface of the diaphragm for generating an output signal as the diaphragm vibrates due to detection of the acoustical waves or pulses in the pressurized water when contained within the main water distribution conduit; a microcontroller being electrically coupled to the accelerometer for processing of output signals of the accelerometer, and the microcontroller determining, from the processed output signals of the accelerometer, whether on not the latching solenoid slave valve is to commence a watering cycle for a desired duration of time.

The present invention further relates to an irrigation system for wirelessly communicating watering instructions to a plurality of latching solenoid slave valves for controlling irrigation of the irrigation system, the irrigation system comprising an irrigation controller being wirelessly coupled to the plurality of latching solenoid slave valves, via a main water distribution conduit, for selectively sending watering instructions to a desired one of the plurality of latching solenoid slave valves, the irrigation controller also being electrically coupled to a pulser valve for controlling operation of the pulser valve and generating acoustical waves or pulses, in pressurized water when contained within the main water distribution conduit, for instructing the desired one of the plurality of latching solenoid slave valves to commence a watering cycle for a desired duration of time; each one of the plurality of latching solenoid slave valves comprising an acoustical receiver comprising a diaphragm, directly communicating with the pressurized water contained within the main water distribution conduit of the irrigation system, for detecting the acoustical waves or pulses transmitted by the pressurized water; a respective accelerometer being supported by an opposite surface of the diaphragm for generating an output signal as the respective diaphragm vibrates due to detection of the acoustical waves or pulses in the pressurized water; and a respective microcontroller being electrically coupled to the respective accelerometer and being programmed for processing of each output signal of the respective accelerometer, and the respective microcontroller being programmed for determining, from the processed output signals of the respective accelerometer whether or not the respective latching solenoid slave valve is to commence the watering cycle for the desired duration of time.

The present invention lastly relates to a method of wirelessly communicating watering instructions to a plurality of latching solenoid slave valves of an irrigation system via an irrigation controller, the method comprising: wirelessly coupling the irrigation controller to the plurality of latching solenoid slave valves, via a main water distribution conduit, for selectively sending watering instructions to a desired one of the plurality of latching solenoid slave valves; electrically coupling the irrigation controller to a pulser valve for controlling operation of a pulser valve and generating acoustical waves or pulses, in pressurized water when contained within the main water distribution conduit, for instructing a selective one of the plurality of latching solenoid slave valves to commence a watering cycle for a desired duration of time; providing each one of the plurality of latching solenoid slave valves with a diaphragm directly communicating with pressurized water, contained within the main water distribution conduit of the irrigation system, for detecting the acoustical waves or pulses transmitted by the pressurized water; supporting a respective accelerometer on an opposite surface of the diaphragm for generating an output signal as the respective diaphragm vibrates due to detection of the acoustical waves or pulses in the pressurized water; and electrically coupling a respective microcontroller to the respective accelerometer for processing of each output signal of the respective accelerometer, and the respective microcontroller determining, from the processed output signals of the respective accelerometer whether or not the respective latching solenoid slave valve is to commence the watering cycle for the desired duration of time.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
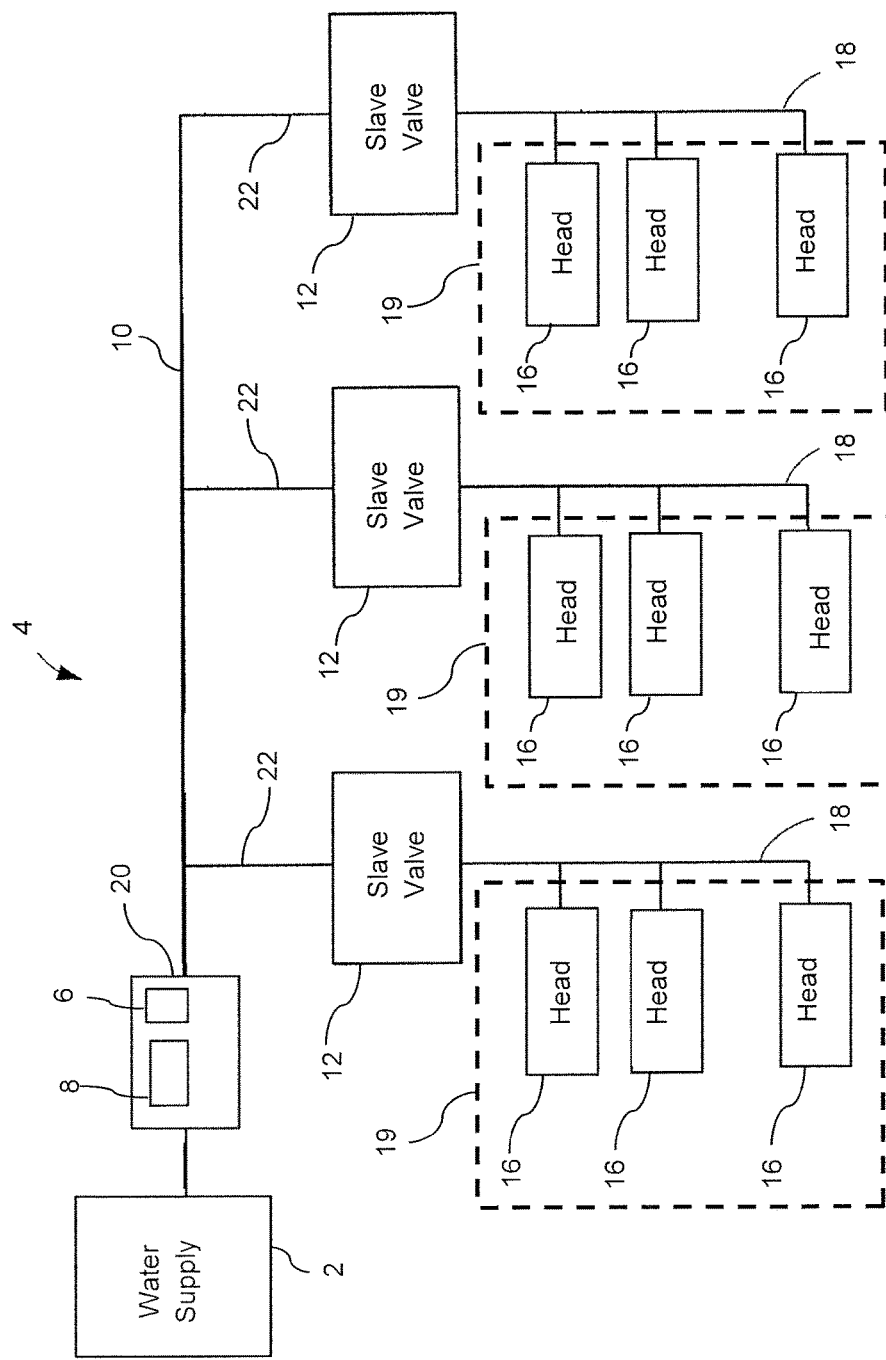
FIG. 1 is a diagrammatic drawing showing the improved irrigation system according to the present invention.

Turning now to FIGS. 1-4B, a brief description concerning the various components according to a first embodiment of the present invention will now be briefly discussed. As shown in FIGS. 1-4B, the main components of the irrigation system 4 of the present invention are: a water supply source 2, a control box 20 with a (pulser) valve 6 and a controller 8, a water distribution conduit 10, at least one slave valve 12 (three of which are shown in FIG. 1), and at least one sprinkler head 16 (three of which are shown for each zone in FIG. 1).

As generally shown in FIG. 1, the irrigation system 4 includes the main water distribution conduit 10 which has a first end thereof fluidly coupled, via the main control box 20, to the water supply source 2. It is noted that while the water supply source 2 is generally a public or private water supply, (e.g., a well), any water supply source 2 is conceivable so long as such a source is capable of supplying pressurized water to the irrigation system 4.

The main control box 20 generally houses both the pulser valve 6 and the irrigation controller 8. However, it is to be appreciated that separate housing is possible for the pulser valve 6 and the irrigation controller 8, so long as the irrigation controller 8 is electrically connected to the pulser valve 6, and the pulser valve 6 is connected to the water supply source 2. The pulser valve 6 is capable of discharging water, for a very short duration of time, e.g., a fraction of a second, from the water supply source 2 to atmosphere, according to command instructions sent by the irrigation controller 8. Note that any publically available irrigation controller is possible so long as it is electrically connected to the pulser valve 6 for controlling operation of the pulser valve 6 and programmed for causing the pulser valve 6 to transmit acoustical waves or pulses P, described in further detail below with respect to FIGS. 4-4B, along the pressurized water contained in the main water distribution conduit 10 of the irrigation system 4.

The main water distribution conduit 10 extends from the main control box 20 and typically branches out into a plurality of separate conduits, branches, fingers or legs 22 which all terminate at a respective latching solenoid slave valve 12 (for the sake of convenience, only three fingers or legs 22 are shown in FIG. 1).

Figure 3:
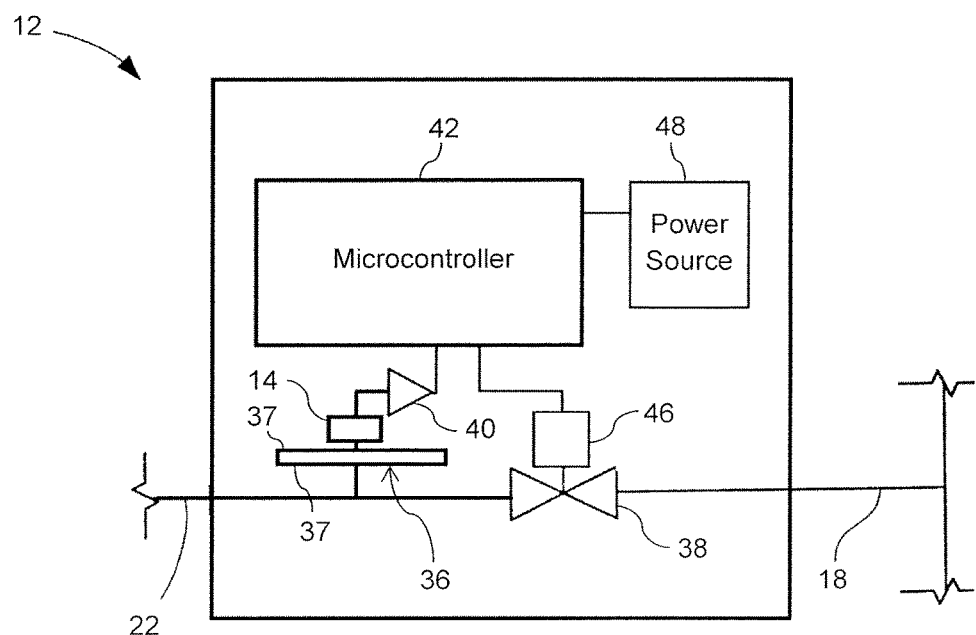
FIG. 3 is a diagrammatic drawing showing the features of the latching solenoid slave valve according to the present invention.
Figure 3A:
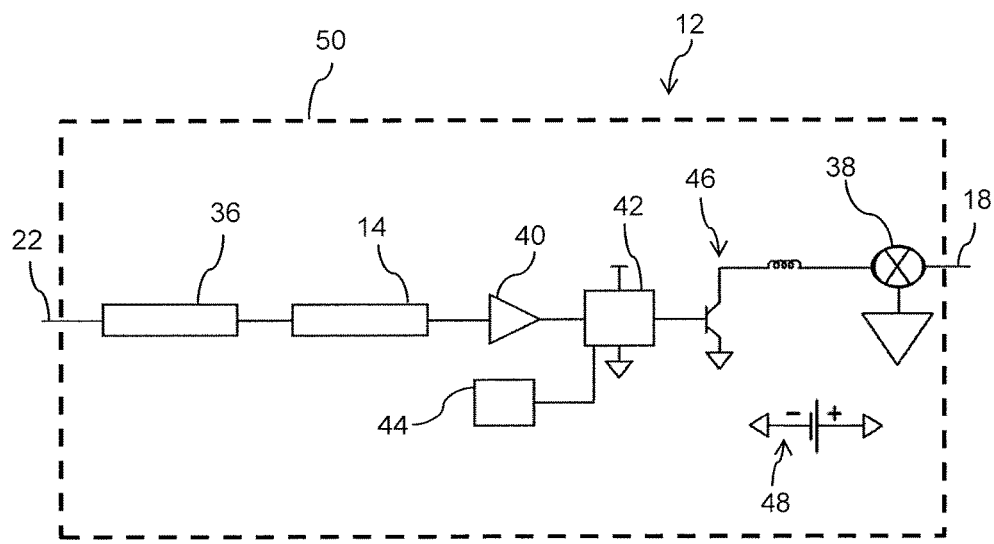
FIG. 3A is a diagrammatic drawing showing a schematic arrangement of the components of the latching solenoid slave valve according to the present invention.
Figure 3B:
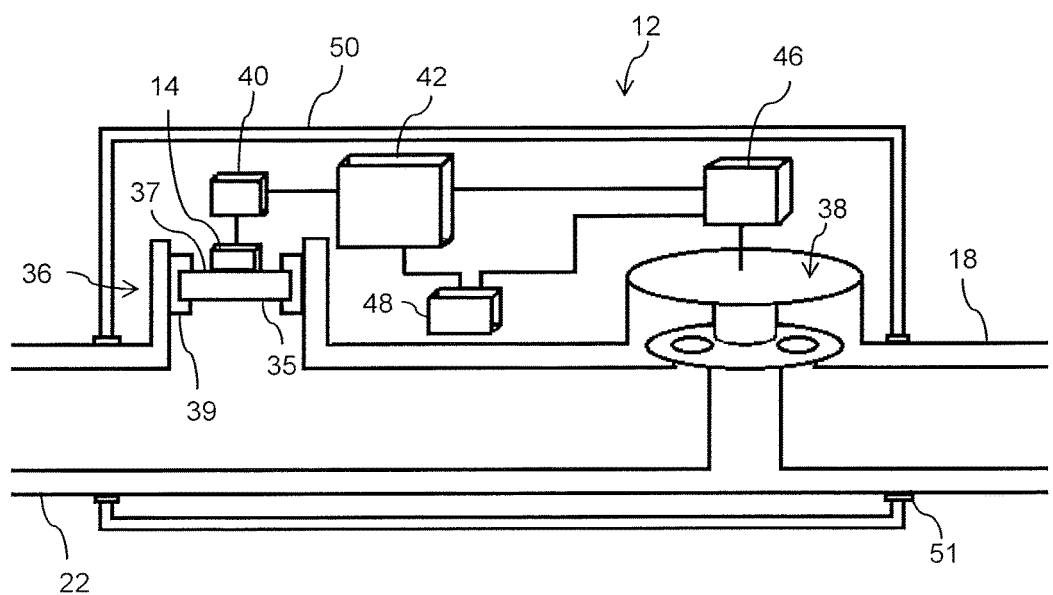
FIG. 3B is a diagrammatic drawing showing another schematic arrangement of the components of the latching solenoid slave valve according to the present invention.
Figure 3C:
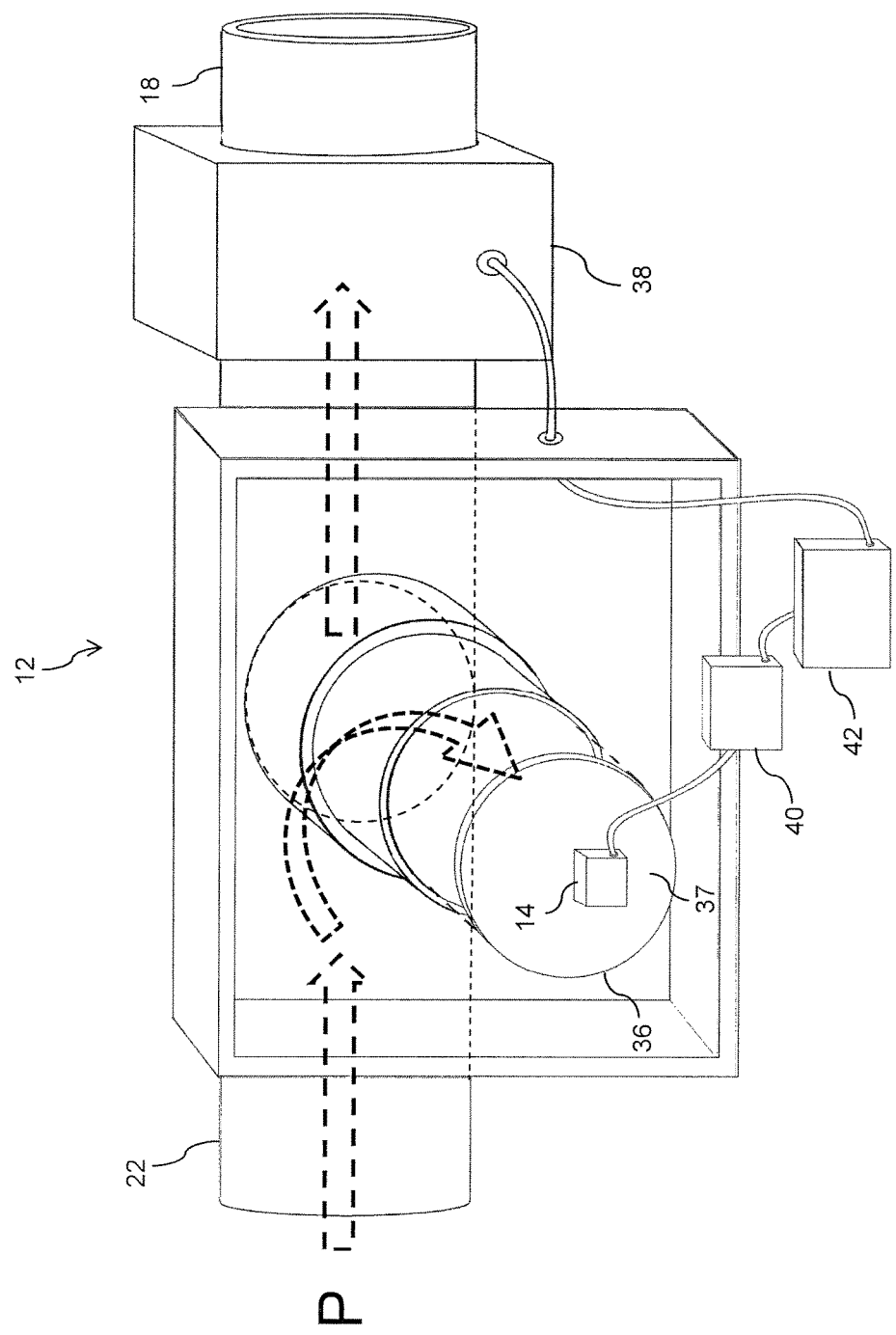
FIG. 3C is an exploded diagrammatic drawing of another schematic arrangement for the components of the latching solenoid slave valve according to the present invention.

As discussed in greater detail with respect to FIGS. 3A-3C, the latching solenoid slave valve 12 receives operating instructions which control operation of each respective latching solenoid slave valve 12. As shown in FIG. 1, each respective latching solenoid slave valve 12 is associated with a plurality of sprinkler heads 16 located in spaced relationship from one another along each respective separate zone distribution conduit 18 of the irrigation system 4 for facilitating watering of a desired area 19 (only diagrammatically shown in FIG. 1). When the respective latching solenoid slave valve 12 is actuated, water is permitted to flow through the respective latching solenoid slave valve 12 to the zone distribution conduit 18 and the associated sprinkler heads 16 for watering of the respective desired area 19.

Figure 2:
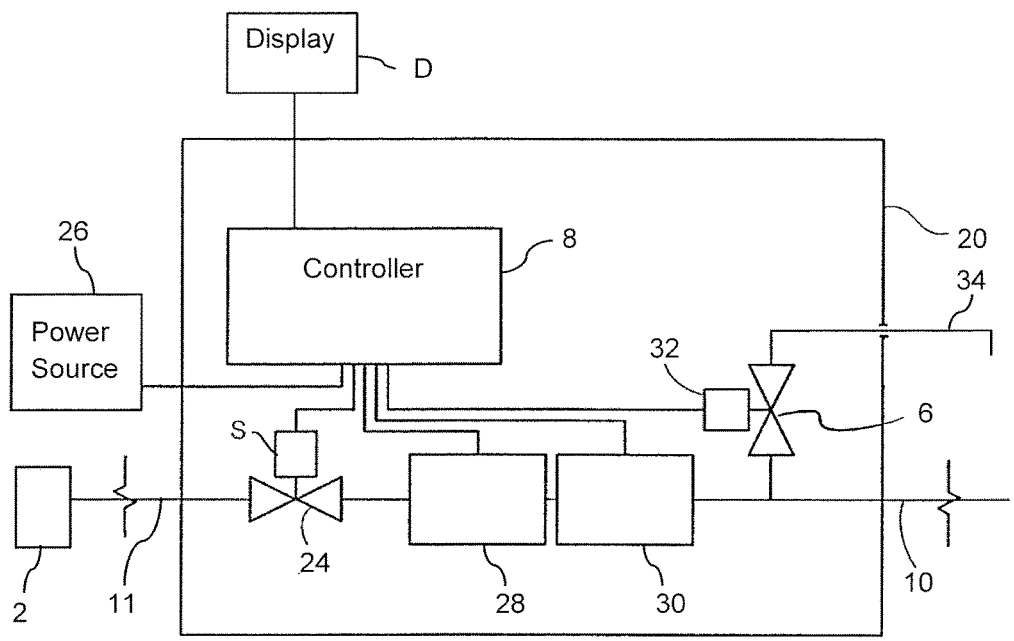
FIG. 2 is a diagrammatic drawing showing the features of the irrigation control box or irrigation controller according to the present invention.

As generally shown in FIG. 2, the main control box 20 typically includes a housing 21 which encloses a main water flow valve 24, the pulsar valve 6, and the irrigation controller 8. As shown, the irrigation controller 8 is electrically connected to a conventional power source 26, e.g., a battery or a wall outlet, for electrically powering the irrigation controller 8. The irrigation controller 8 is programmed for controlling operation of the irrigation system 4 and is electrically coupled to at least the main water flow valve 24 and the pulser valve 6.

The main water flow valve 24 is fluidly coupled to the water supply source 2, via at least a source supply conduit 11, and fluidly coupled to a first inlet end of the main water distribution conduit 10. In addition, as noted above, the main water flow valve 24 is electrically coupled to the irrigation controller 8 to assist the irrigation controller 8 with controlling operation of the main water flow valve 24 and the flow of water from the water supply source 2 to the irrigation system 4.

Similarly, the pulser valve 6 is typically also fluidly connected to the main water distribution conduit 10 adjacent the first end of the main water distribution conduit 10, but downstream of the main water flow valve 24. A solenoid operated valve 32 of the pulsar valve 6 is electrically coupled to the irrigation controller 8 for receiving operating commands for controlling operation thereof.

An outlet end 34 of the solenoid operated valve 32 of the pulser valve 6 is directly vented to the atmosphere, e.g., to an area of the lawn or yard, a flower bed, a garden, or possibly to a septic or a sewage system, for periodically discharging a very small volume of water from the main water distribution conduit 10. When the irrigation controller 8 issues a command instructing the pulser valve 6 to "open" the associated solenoid operated valve 32, pressurized water is permitted to flow from the water supply source 2 into and along a small section of the main water distribution conduit 10 and out through the associated the pulser valve 6 where such water is directly or indirectly vented to the atmosphere. As a result of such water flowing through the pulser valve 6, a pressure drop immediately occurs at the associated solenoid operated valve 32 and this pressure drop, in turn, creates an acoustical wave or pulse P in the water contained within the main water distribution conduit 10. Shortly after the irrigation controller 8 issues the command instructing the associated solenoid operated valve 32 of the pulser valve 6 to open, thereafter the solenoid operated valve 32 of the pulser valve 6 closes. Such closure again interrupts the flow of water from the water supply source 2 out through the pulser valve 6 to the atmosphere. Rather than separate and discrete open and close commands associated with the master and slave latching valves, the associated solenoid operated valve 32 of the pulser valve 6 is controlled by a single electrical pulse of the duration specified, e.g., 25 to 100 milliseconds.

Typically, at least one of a water pressure detecting device 28, e.g., a pressure meter or pressure transducer, and/or a water flow meter 30 is located downstream of the main water flow valve 24. The water pressure detecting device 28 and/or the water flow meter 30 are electrically coupled to the irrigation controller 8 for respectively providing water pressure and water flow information to the irrigation controller 8 for use in controlling operation of the irrigation system 4.

As discussed above and as generally shown in FIG. 1, each one of the fingers or legs 22 of the main water distribution conduit 10 terminates at a respective latching solenoid slave valve 12. As further discussed with respect to FIGS. 3-3C, the slave latching valve 38, of the latching solenoid slave valve 12, then separates each one of the fingers or legs 22 of the main water distribution conduit 10 from a respective zone distribution conduit 18.

Each latching solenoid slave valve 12 has an associated pulse receiver and/or diaphragm 36 for receiving operating instructions which control operation of each respective latching solenoid slave valve 12. Each respective latching solenoid slave valve 12 is connected so that the respective diaphragm 36 is located upstream and is in constant and continuous direct communication with the pressurized water contained within a respective finger or leg 22 of the main water distribution conduit 10 of the irrigation system 4.

As shown in FIGS. 3B and 3C, the diaphragm 36 is located within a conduit branch 23 of the finger or leg 22 of the main water distribution conduit 10. A first surface 35 of the diaphragm 36 directly communicates and interfaces with the pressurized water contained within the main water distribution conduit 10. This arrangement ensures that the diaphragm 36 is continuously located to receive operation instructions from the irrigation controller 8, as discussed in further detail below. As a result of this configuration, the diaphragm 36 is positioned so as to be vibrated by each acoustical wave or pulse P (diagrammatically shown by dotted line arrows in FIG. 3C) which are generated by the pulser valve 6 and transmitted through the pressurized water contained within the respective finger or legs 22 of the main water distribution conduit 10 of the irrigation system 4.

Typically, the diaphragm 36 is supported about its periphery by a resilient seal material 39, e.g., a compressible O-ring forming a water-tight seal and holding the outer perimeter of the diaphragm 36 rigidly in place. This compressible sealing ring 39 maintains a watertight seal with the remaining support structure (e.g., housing 50) of the latching solenoid slave valve 12.

The diaphragm itself is generally manufactured from a thin metal, or some other rigid yet flexibly durable material which permits the diaphragm 36 to vibrate and move to and fro upon being exposed to an acoustical wave or pulse P. That is, the diaphragm is a material which enables the diaphragm to flex inward due to the pressure drop, when the pulser valve is opened, and then flex outward, when the pulse valve closes and the original pressure is restored.

The diaphragm 36 is typically circular in shape and has a diameter of between 0.5 and 4 inches or so and typically has a thickness of between 0.01 to 0.25 of an inch or so. As noted above, the first surface 35 directly communicates with the pressurized water contained within the main water distribution conduit 10. A central region of a second surface 37, opposite the first surface 35 of the diaphragm 36, supports an associated accelerometer 14.

The accelerometer 14 is typically a three axis accelerometer 14 but, according to the present invention, only one axis of the accelerometer 14 is typically required for operation of the accelerometer 14. When an acoustical wave or pulse P is created or generated within the pressurize water contained with in the main water distribution conduit 10 of the irrigation system 4, such acoustical wave or pulse P is transmitted through the pressurize water contained with in the main water distribution conduit 10 and eventually contacts the first side 35 of each one of the diaphragms 36. The detected acoustical wave or pulse P causes the respective diaphragm 36 to correspondingly vibrate and such vibration of the diaphragm 36, in turn, causes the respective accelerometer 14 to move to and fro along with the vibration of the respective diaphragm 36.

As a result of such movement, each respective accelerometer 14 generates an output signal indicating detection of an acoustical wave or pulse P, and this output signal is sent to a respective amplifier 40 which is electrically coupled to the accelerometer 14 in a conventional manner. The amplifier 40, in turn, amplifies the generated signal from the accelerometer 14, in a conventional manner, and this amplified signal is then transmitted to a respective microcontroller 42 which is electrically coupled to the amplifier 40 in a conventional manner. A respective memory 44, which facilitates storage of desired information, is electrically coupled to the microcontroller 42 in a conventional manner. The microcontroller 42 is electrically coupled to a respective driver 46, in a conventional manner, and the driver 46 is, in turn, coupled to a respective slave latching valve 38 of the latching solenoid slave valve 12 in a conventional manner. As generally shown in FIGS. 3 and 3B, the slave latching valve 38, of the latching solenoid slave valve 12, also separates the respective finger or leg 22, of the main water distribution conduit 10, from the respective zone distribution conduit 18.

The microcontroller 42 is typically battery operated, e.g., powered by a 6 or 12 volt lithium battery 48 which is electrically connected for supplying electrical power to the microcontroller 42 to facilitate operation thereof. According to a preferred embodiment of the present invention, the microcontroller 42 is designed to operate at a very low power level, e.g. operate from 2 to 3 volts at micro amps of current. As a result, each one of the microcontrollers 42 is able to operate for many years before replacement of the battery 48 becomes necessary.

If desired, a small turbine, or some other electrical generator (not shown), may be located within the respective zone distribution conduit 18 to facilitate periodic recharging of the battery 48 as the water flows through the respective zone distribution conduit 18. That is, as water is permitted to flow along the respective zone distribution conduit 18, the flowing water drives the small turbine, or other electrical generator, in order to generate electrical power which is supplied to the battery 48 to facilitate periodic recharging thereof.

As diagrammatically shown in FIG. 3A, the diaphragm 36, the accelerometer 14, the amplifier 40, the microcontroller 42, the memory 44, the battery 48 and the driver 46 are all typically housed within a common enclosure or housing 50 (only diagrammatically shown). The common enclosure or housing 50 permits these components to be buried underground while still facilitating the diaphragm 36 and the accelerometer 14 to move or vibrate, to and fro, without being hindered by the ground or some other obstruction. If desired, the enclosure or housing 50 may form a second watertight barrier or seal which prevents any water, dirt and/or moisture from infiltration inside the enclosure or housing 50 and affecting operation of the various components, especially the to and fro movement of the diaphragm 36 and the accelerometer 14.

According to the present invention, the primary purpose of rapidly opening and closing the pulser valve 6, over very short durations of time, is to create the desired pressurized acoustical waves or pulses P in the pressurized water contained within the main water distribution conduit 10 of the irrigation system 4. Since the main water distribution conduit 10 is normally filled with pressurized water, the generated or created pressurized acoustical waves or pulses P travel along the main water distribution conduit 10 toward each one of the diaphragms 36 of the latching solenoid slave valve 12 which are in direct communication with pressurized water in the main water distribution conduit 10. Each one of the detected acoustical waves or pulses P causes each of the respective diaphragms 36 to oscillate. This damped oscillation of the diaphragm 36, in turn, causes the respectively supported accelerometer 14 to vibrate and thereby generate an output signal forming part of the operating instructions of the irrigation system 4, as discussed in further detail below.

Although there are several techniques generally know to those skilled in the art for communication, according to one embodiment of the present invention, the pulser valve 6 is a solenoid operated valve 32 that has an inlet end thereof directly connected to main water distribution conduit 10 of the irrigation system 4 while an outlet end of the solenoid operated valve 32 of the pulser valve 6 is directly vented to the atmosphere. When irrigation controller 8 issues a command instructing the associated solenoid operated valve 32 to "open" the pulsar valve 6, pressurized water is permitted to flow from the water supply source 2 into and partially along the main water distribution conduit 10 and out through the pulsar valve 6 where such water is directly or indirectly vented to the atmosphere.

As a result of such water flow through the associated solenoid operated valve 32 of the pulser valve 6, a pressure drop occurs at the associated solenoid operated valve 32 and this pressure drop thereby creates an acoustical wave or pulse P. As described above, rather than separate, discrete open and close commands like those used for the master and slave latching valves, the pulsar valve 6 in this embodiment is controlled by a single electrical pulse for the specified duration. Thus, shortly after the pulsar valve 6 is opened, e.g., 0.025-10 seconds, and more preferably, 25 to 100 milliseconds, the pulser valve 6 closes and thereby interrupts the flow of water from the water supply source 2 out through pulsar valve 6 to the atmosphere.

The created pressure drop or generated acoustical wave or pulse P then travels from the associated solenoid operated valve 32 of the pulser valve 6 through the pressurize water contained within the main water distribution conduit 10 of the irrigation system 4, including along each finger or leg 22 thereof to each of the respective diaphragms 36. As a result, the generated acoustical wave or pulse P is substantially instantaneously transmitted, by the pressurized water contained within the main water distribution conduit 10, to each one of the diaphragms 36 of each latching solenoid slave valve 12 of the irrigation system 4. Typically the generated acoustical wave or pulse P travels with a velocity of approximately 1,500 feet per second.

Each microcontroller 42 is preprogrammed with a specific identification code or ID number, e.g., the first latching solenoid slave valve, the second latching solenoid slave valve, the third latching solenoid slave valve, the fourth latching solenoid slave valve, the fifth latching solenoid slave valve, the sixth latching solenoid slave valve, the seventh latching solenoid slave valve, the eighth latching solenoid slave valve, etc., which is utilized to distinguished one microcontroller 42 from the other microcontrollers 42. The microcontroller 42 is electrically coupled to the driver 46 which, in turn, is electrically coupled to the slave latching valve 38 of the respective latching solenoid slave valve 12.

Thus, when instructed by the microcontroller 42, the driver 46 will transmit an "open" signal, e.g., a 20-1000 milliamp signal, more preferably a 200-500 milliamp signal to the respective slave latching valve 38. Alternatively, the "open" signal may be an electrical pulse approximately 12 volts with a duration of 0.500 to 1.00 seconds, Regardless of the voltage, this signal causes the slave latching valve 38 to switch to an open position and commence the flow of the pressurized water from the main water distribution conduit 10 into the zone distribution conduit 18. The zone distribution conduits 18 are connected to but are located downstream of the latching solenoid slave valve 12, for water distribution to the sprinkler heads 16 connected along that zone distribution conduit 18 of the irrigation system 4.

After the slave latching valve 38 of the respective latching solenoid slave valve 12 is switched on, operation commences for a desired duration of time, e.g., typically anywhere from a few minutes to 60 minutes or so. Thereafter, the microcontroller 42 will then provide another instruction to the driver 46 which causes the driver 46 to transmit a closing signal, e.g., a 200-500 milliamp signal, to the respective slave latching valve 38. Alternatively, the slave latching valve close signal is an electrical pulse of approximately 12 volts having a duration of 0.500 to 1.00 seconds. Generally, the opening signal will have an opposite polarity of the closing signal. Providing signals with an opposite polarity more readily signals reversal of the positive and negative terminals. Upon receipt of the closing signal, the slave latching valve 38 will close and thereby discontinue the flow of the pressurized water to the sprinkler heads 16 contained within the specific zone 19 of the irrigation system 4.

The irrigation controller 8 will typically issue a series of commands, e.g., four sequential commands, to the pulser valve 6. These sequential commands facilitate four sequential, but separate and discrete discharges of pressurized water from the main water distribution conduit 10 of the irrigation system 4. Thereby generating a series of four acoustical waves in the pressurized pressurize water contained within the main water distribution conduit 10 of the irrigation system 4. This sequential series of acoustical waves, in turn, simultaneously communicates the desired operating instructions to the microcontrollers 42 of each one of the latching solenoid slave valves 12 of the irrigation system 4. Alternatively, the irrigation controller may issue a series of electrical pulses, e.g., seven sequential pulses which are temporally spaced. See below for a discussion in which the series of seven acoustical waves define six time periods and thereby represent commands to the pulser valve.

The communicated operating instructions relate to 1) which one of the plurality of latching solenoid slave valves 12 is to commence operation, and 2) the specific duration of time the instructed latching solenoid slave valve 12 is to operate before the respective slave latching valve 38 will be automatically closed by the associated microcontroller. After the instructed latching solenoid slave valve 12 operates for the desired duration of time, the irrigation controller 8 will then wait a brief predetermined period of time, e.g., a delay of typically anywhere from a few seconds or so to up to 5 minutes or so, before issuing another series of commands to the pulser valve 6 in order to communicate instructions to another one of the latching solenoid slave valves 12 to commence a watering cycle.

The above process is repeatedly repeated until each desired zone, of the irrigation system 4, operates for the desired watering time. Thereafter, the irrigation system 4 will then become passive until another watering cycle is either automatically initiated by the irrigation controller 8 or manually initiated by human intervention or possibly remotely by an application, e.g., a mobile "app" on a cell phone or some other mobile communication device. As such mobile applications are conventional and well know in the art, a further detail discussion concerning the same is not provided.

As noted above, the irrigation controller 8 activates the pulser valve 6 in a manner that creates or generates acoustical waves or pulses P that can be detected by each one of the diaphragms 36 and associated accelerometers 14 and, thereafter, is transmitted to the respective microcontroller 42. It is to be appreciated that there are many techniques which would be readily apparent to those skilled in the art concerning how the irrigation controller 8 may operate or sequence the pulser valve 6 in order to generate the desired acoustical waves or pulses P and facilitate communicating with the various latching solenoid slave valves 12 for individually instructing which one of the various latching solenoid slave valves 12 is to commence a desired watering cycle. One possible example is discussed below with reference to FIGS. 4-4B.

As briefly discussed above, the main purpose of each respective diaphragm 36, the supported accelerometer 14, the respective amplifier 40 and the respective microcontroller 42, is to detect and decode the modulated acoustical waves or pulses P which are generated and supplied by the pressurized water contained within the water distribution conduit 10 of the irrigation system 4. In order to facilitate communication, each one of the latching solenoid slave valves 12 must be initially preprogrammed with or assigned an associated identification code or ID number, e.g., the first latching solenoid slave valve, the second latching solenoid slave valve, the third latching solenoid slave valve, the fourth latching solenoid slave valve, the fifth latching solenoid slave valve, the sixth latching solenoid slave valve, the seventh latching solenoid slave valve, the eighth latching solenoid slave valve, etc.

When the respective microcontroller 42 detects its assigned identification code or ID number, via suitable activation and movement of the respective diaphragm 36 and accelerometer 14, then the respective microcontroller 42 will issue a command, via the respective driver 46, to the respective slave latching valve 38 to commence a watering cycle and the slave latching valve 38 will remain in an open operating position for the instructed desired operating duration or watering cycle. Once this operating time expires, the respective microcontroller 42 will then issue another command to the respective slave latching valve 38, via the respective driver 46, instructing the respective slave latching valve 38 to move to a closed position and thereby discontinue its watering cycle. As noted above, each one of the latching solenoid slave valves 12 has an unique identification code or ID number and will only commence a watering cycle when the respective microcontroller 42 detects its associated unique identification code or ID number.

Figure 4:
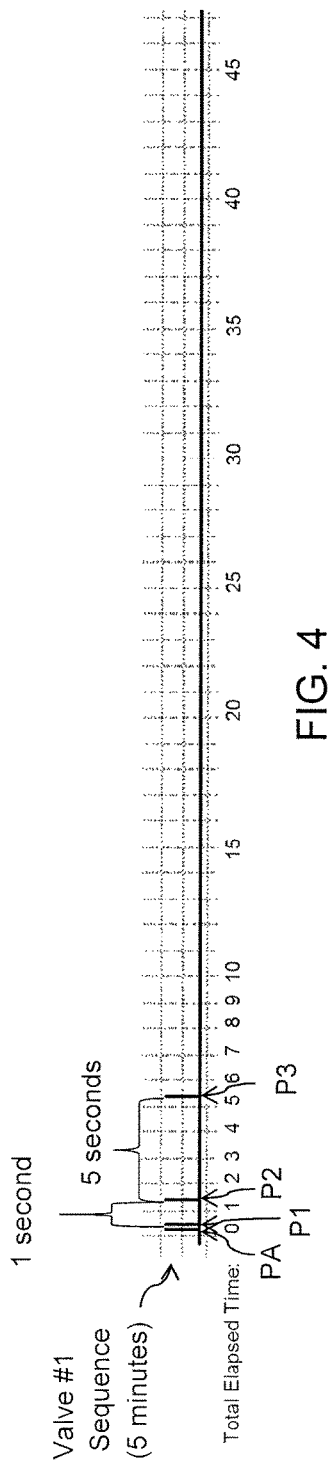
FIG. 4 is a diagrammatic illustration of a possible first pulse sequence for actuating a first latching solenoid slave valve.
Figure 4A:
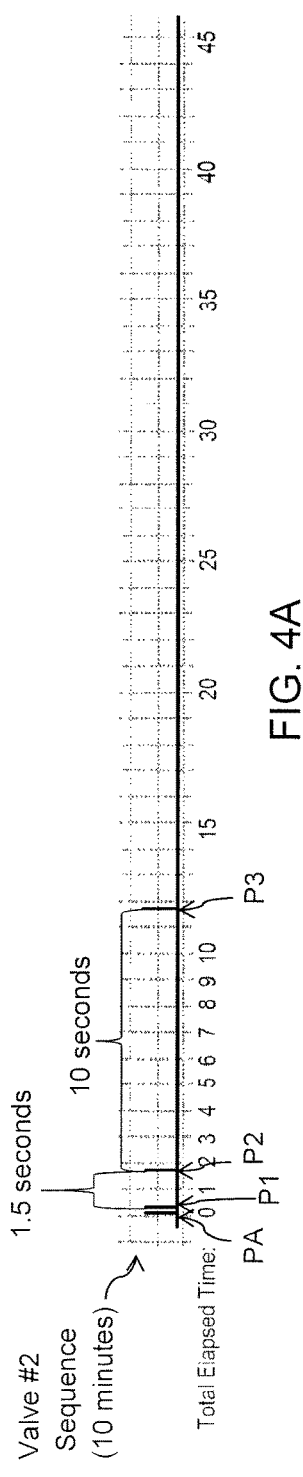
FIG. 4A is a diagrammatic illustration of a possible second pulse sequence for actuating a second latching solenoid slave valve.
Figure 4B:
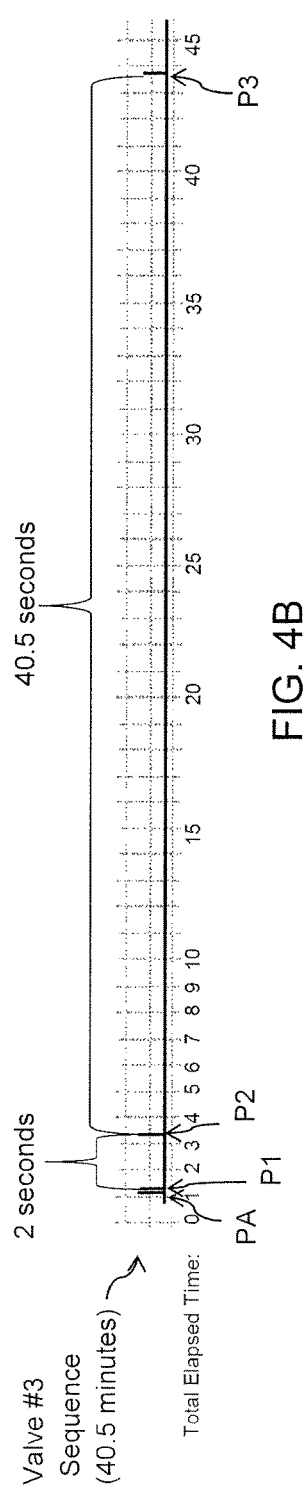
FIG. 4B is a diagrammatic illustration of a possible further pulse sequence for actuating a further latching solenoid slave.

As diagrammatically shown in FIGS. 4-4B, the modulation typically comprises a series of acoustical waves or pulses P in which the number of pulses P and the elapsed time T between each sequential acoustical wave or pulse P is utilized to transmit the unique identification code or ID number to each one of the microcontrollers 42 of the desired latching solenoid slave valve 12 to be operated as well as the desired time for the watering cycle. It is to be appreciated that a variety of various modulation and decoding techniques, which are well known in the art, would readily be apparent to those skilled in the art and would be applicable to this invention without departing from the spirit and scope of the present invention.

According to one embodiment, the modulation and decoding technique comprises a series of pulses P. The series of pulses P comprise an alert acoustical wave or pulse PA which notifies each one of the microcontrollers 42, of each respective latching solenoid slave valve 12, to be ready to receive an operating command from the irrigation controller 8. This alert acoustical wave or pulse PA assists each one of the respective microcontrollers 42 with deciphering "noise," which may be commonly present within of the irrigation system 4, from actual instruction commands being issued by the irrigation controller 8. Shortly after sending the alert acoustical wave or pulse PA, e.g., a span of between 1-5 seconds or so, the irrigation controller 8 will then instruct the pulse valve to again discharge additional water to the atmosphere and thereby generate a first instructional acoustical wave or pulse P1.

This first instructional acoustical wave P1 will then initiate transmission of the operating instructions. This first set of instructions will indicate which one of the latching solenoid slave valves 12 is to commence a watering cycle, e.g., the first latching solenoid slave valve, the second latching solenoid slave valve, the third latching solenoid slave valve, the fourth latching solenoid slave valve, the fifth latching solenoid slave valve, the sixth latching solenoid slave valve, the seventh latching solenoid slave valve, the eighth latching solenoid slave valve, etc. The indication of which of the desired latching solenoid slave valves 12 is to commence a watering cycle is achieved by a duration of time between the first pulse P1 and a second pulse P2. That is, the irrigation controller 8 instructs the pulser valve 6 to discharge additional water to atmosphere and generate the second instructional acoustical wave or pulse P2. The duration of time between the time when the first instructional acoustical wave or pulse P1 and the time when the second instructional acoustical wave or pulse P2 are respectively issued are utilized to identify which one of the latching solenoid slave valves 12 is to commence a watering cycle.

For example, as shown in FIG. 4, if the time between issuance of the first instructional acoustical wave or pulse P1 and the second instructional acoustical wave or pulse P2 is duration of time of 1 second, then the respective microcontroller 42 of the first latching solenoid slave valve 12 determines that the first latching solenoid slave valve 12 is to commence a watering cycle. Or, as shown in FIG. 4A, if the time between issuance of the first instructional acoustical wave or pulse P1 and the second instructional acoustical wave or pulse P2 is 1.5 seconds, then the respective microcontroller 42 of the second latching solenoid slave valve 12 determines that the second latching solenoid slave valve 12 is to commence a watering cycle. Alternatively, as shown in FIG. 4B, if the time between issuance of the first instructional acoustical wave or pulse P1 and the second instructional acoustical wave or pulse P2 is 2 seconds, then the respective microcontroller 42 of the third latching solenoid slave valve 12 determines that the third latching solenoid slave valve 12 is to commence a watering cycle, and so forth.

Once the irrigation controller 8 instructs the desired latching solenoid slave valve 12 to commence a watering cycle, the irrigation controller 8 then send further instructions concerning the duration of time that the desired latching solenoid slave valve 12 is to operate. This may be achieved by the irrigation controller 8 instructing the pulse valve to generate a third instructional acoustical wave or pulse P3.

For example, as shown in FIG. 4, if the time between issuance of the second instructional acoustical wave or pulse P2 and the third instructional acoustical wave or pulse P3 is 5 seconds, then the respective microcontroller 42 of the latching solenoid slave valve 12 determines that the respective slave latching valve 38 is to operate for a total duration of 5 minutes. Thereafter, the respective microcontroller 42 will automatically shut off the respective slave latching valve 38. For example, as shown in FIG. 4A, if the time between issuance of the second instructional acoustical wave or pulse P2 and the third instructional acoustical wave or pulse P3 is 10 seconds, then the microcontroller 42 will determine that the respective slave latching valve 38 is to operate for a total duration of 10 minutes, Thereafter the respective microcontroller 42 will automatically shut off the respective slave latching valve 38. Alternatively, for example, as shown in FIG. 4B, if the time between issuance of the second instructional acoustical wave or pulse P2 and the third instructional acoustical wave or pulse P3 is 40.5 seconds, then the microcontroller 42 will determine that the respective slave latching valve 38 is to operate for a total duration of 40 minutes and 30 seconds and, thereafter, the respective microcontroller 42 will automatically shut off the respective slave latching valve 38.

It is to be appreciated that either longer or shorter time intervals, between the first and the second instructional acoustical waves or pulses P1 and P2 or between the second and the third instructional acoustical waves or pulses P2 and P3, etc., or alternative coding patterns altogether, may be utilized to transmit the desired unique identification code or ID number and operating time for the slave latching valve 38 without departing from the spirit and scope of the present invention.

Thereafter, the instructed slave latching valve 38 of the respective latching solenoid slave valve 12 will then open and commence its watering cycle. As this occurs, either a pressure drop, detected by the pressure device 28, or detection of water flow, by the water flow meter 30 of the irrigation system 4, will indicate to the irrigation controller 8 that transmitted operating instructions were safely received by the desired latching solenoid slave valve 12 and the instructed watering cycle is proceeding. Once such watering cycle commences, all of the remaining microcontrollers 42, of each one of the non-activated latching solenoid slave valves 12, will then enter into a "dormant" state for a period of time that exceeds the instructed watering time of the currently operating latching solenoid slave valve 12, e.g., each one of the non-activated latching solenoid slave valves 12 will become dormant for the instructed watering time plus an additional dormant time, e.g., 15 second to 5 minutes or so.

That is, if the operating latching solenoid slave valve 12 is instructed by the irrigation controller 8 to water for a total of 20 minutes, then each one of the microcontrollers 42 will ignore all acoustical waves or pulses P that the respective diaphragms 36 and accelerometers 14 may receive and detect during the next 22 minutes, e.g., the 20 minutes for the instructed watering time plus an additional dormant time of 2 minutes to allow the irrigation system 4 to again stabilize. In at least one embodiment, the system typically becomes stable in less than one minute. This delay, e.g., 1 minute in this instance, generally ensures that the irrigation system 4 restabilizes and thus is generally free of noise before the next sequence of acoustical waves or pulses P are issued by the irrigation controller 8 for commencing operation of another watering cycle by another latching operated slave valve. The above process is repeated until each one of the desired zones of the irrigation system 4 operates for a desired duration of time.

According to one embodiment, the microcontroller 42 of each respective latching solenoid slave valve 12 may have the ability to transmit a signal back to the irrigation controller 8 which can notify the irrigation controller 8 that the respective battery 48 powering the microcontroller 42 is low, e.g., is at a sufficiently low power left, and thus requires replacement. This can be done, for example, by the microcontroller 42 instructing the latching solenoid slave valve 12 to open and close in a desired sequence, e.g., rapidly open and close and then rapidly open and close two times in sequence with a desired time interval, e.g., 1-10 second(s) apart from one another. As a result of such rapid opening and closing of the slave latching valve 38 of the latching solenoid slave valve 12 that just completed is watering cycle, the irrigation controller 8 can detect, by either an associated diaphragm and an accelerometer (not shown), similar to each of the latching solenoid slave valve 12, or by detecting, or via the pressure device 28 and/or the water flow meter 30 of the irrigation system 4, a change in pressure or the flow of additional water along the main water distribution conduit 10, at a time after the time that the latching solenoid slave valve 12 was to discontinue a watering cycle. Such detection of a change in pressure or the flow of additional water is interpreted, by the irrigation controller 8, as the need to replace the battery 48 of the respective latching solenoid slave valve 12 that just finished operating.

Alternatively, the microcontroller 42 of each respective latching solenoid slave valve 12 may notify the irrigation controller 8 that the respective battery 48 is low, by other means, Such methods may eliminate unnecessarily activating latching valve and save power.

Regardless of methodology employed, after receipt of the appropriate signal, the irrigation controller 8 can then display a suitable message on the display D of the irrigation controller 8 or alternative user interface display. Thereby informing the operator of the irrigation system 4 of the need to replace the battery 48 for a particular latching solenoid slave valve 12.

Figure 5:
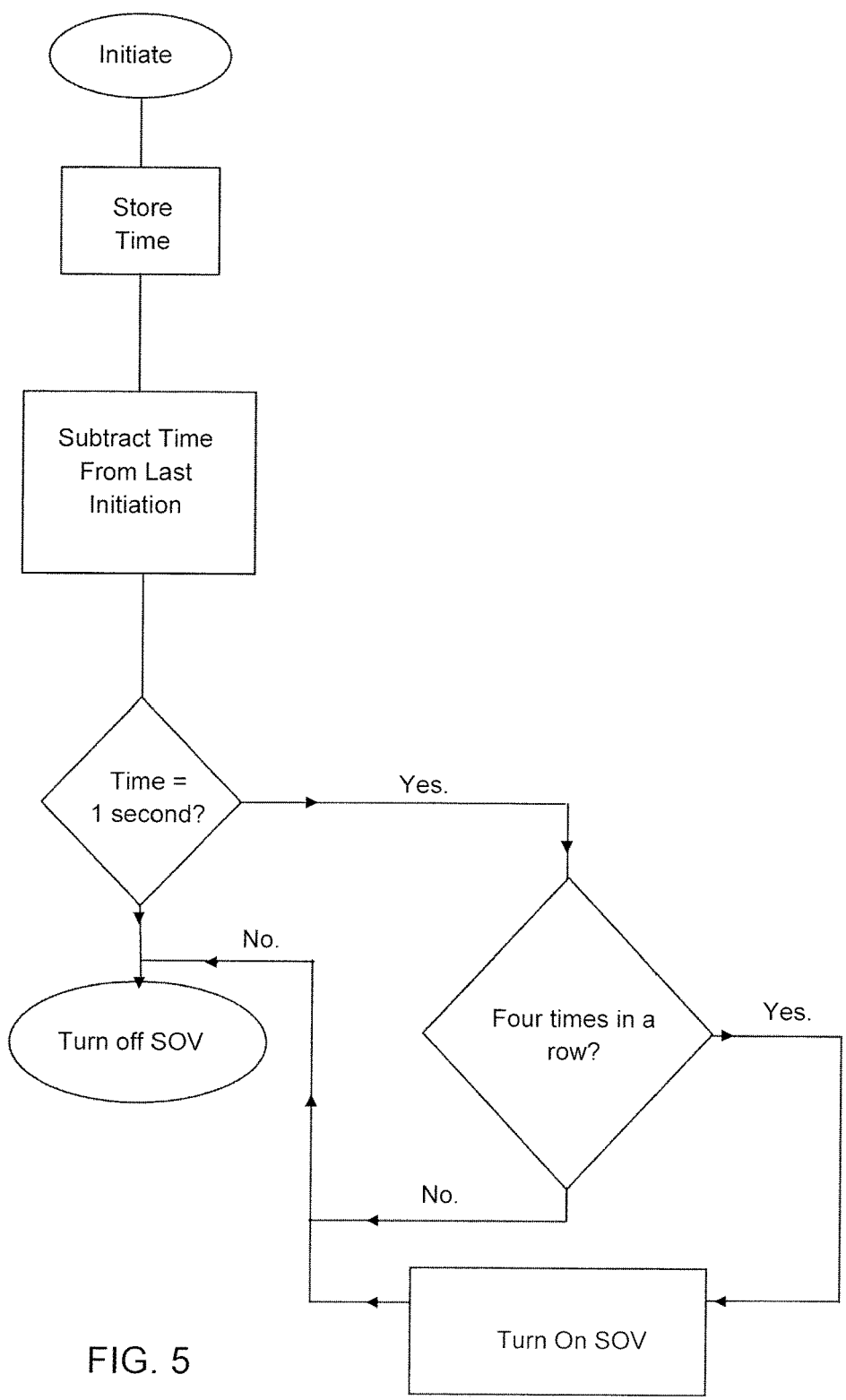
FIG. 5 is a diagrammatic drawing showing a possible flow logic for the software for practicing the present invention.
Figure 5A:
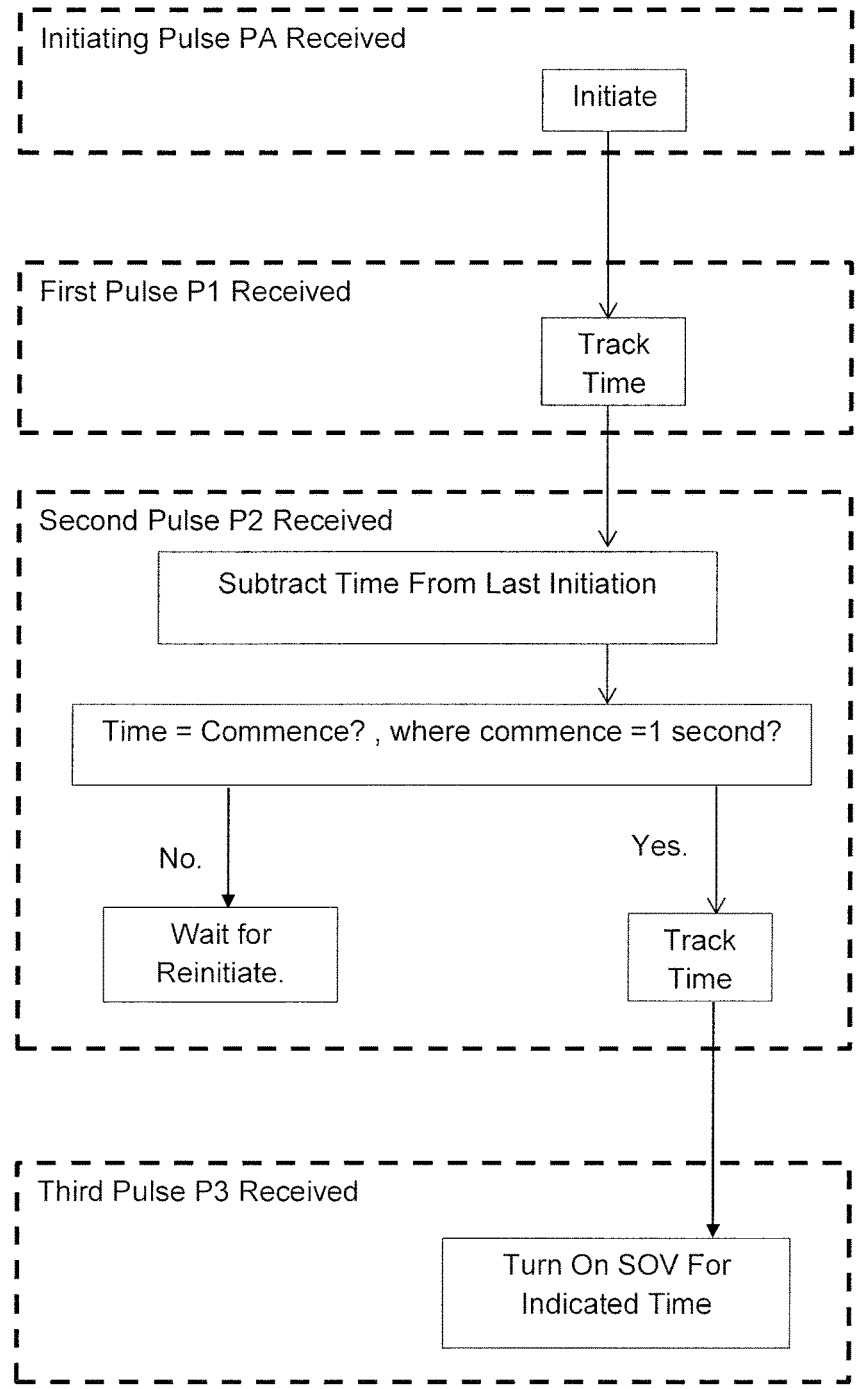
FIG. 5A diagrammatically illustrates another possible logic flow for the software for practicing the embodiment shown in FIG. 4.

A logic flow diagram of suitable software utilized with the present invention is diagrammatically shown in FIGS. 5 and 5A. As previously discussed, upon receiving an alert acoustical wave or pulse PA, the microcontroller 42 is notified to be ready to receive an operating command from the irrigation controller 8, e.g., be ready to "initiate" operation. The irrigation controller 8 then stores this time in the memory as "store time" and begins to track the time which elapses. Upon receiving another acoustical wave or pulse, the microcontroller 42 then saves/records the time and subtracts the newly save time of the subsequent acoustical wave or pulse from the previous acoustical wave or pulse to determine the elapsed time, i.e., the duration of time between two sequential pulses. As diagrammatically shown in FIG. 5, the software could require the operating instructions from the irrigation controller 8 to be received two or more times, e.g., four times as shown, before the microcontroller 42 actually actuates the associated slave latching valve 38 and commences the instructed watering cycle.

In the logic flow diagram of FIG. 5, the desired time for activation is determined based upon the number of immediate pulses following the identifying pulse(s). However, it is also possible to indicate the desired period of operating time based upon an elapsed time between the second and the third pulses, as described above with reference to FIGS. 4-4B. For example, a logic flow diagram of suitable software of a microcontroller 42 for a first latching solenoid slave valve 12 is diagrammatically shown in FIG. 5A. Upon receipt of an alert acoustical wave or pulse PA, the microcontroller 42 of the first latching solenoid slave valve 12, as well as the other latching solenoid slave valves 12, initialize. Upon receipt of the first acoustical pulse P1, the microcontroller 42 of the first latching solenoid slave valve 12 begins to monitor the elapsed time before the next acoustical pulse is received. If the precisely assigned time elapses, between the first acoustical pulse P1 and the second received acoustical pulse P2, i.e., 1 second in this instance which is the assigned time for the first latching solenoid slave valve 12, then the microcontroller 42 of the first latching solenoid slave valve 12 determines that the first latching solenoid slave valve 12 it is to commence a watering cycle.

At least the microcontroller 42 of the first latching solenoid slave valve 12 still continues monitoring the elapsed time so that, upon receipt of the third acoustical pulse P3, the microcontroller 42 of the first latching solenoid slave valve 12 can readily determine how long to water before turning off the first latching solenoid slave valve 12. That is, the microcontroller 42 monitors the elapsed time between the second and the third acoustical pulses P2 and P3 so as to determine the duration for the requested watering cycle for the first latching solenoid slave valve 12.

Thus, if an operator desires to turn on the sprinklers 16 associated with the first latching solenoid slave valve 12 for a total of five minutes, the irrigation controller 8 generates the alert, the first, the second and the third pulses PA, P1, P2 and P3 as shown in FIG. 4. That is, in this example, shortly after sending the alert acoustical pulse PA, e.g., a time span of less than one second, the irrigation controller 8 then instructs the pulse valve 6 to again discharge additional water to the atmosphere and thereby generate a first instructional acoustical pulse P1. Precisely one (1) second after the first pulse P1, the irrigation controller 8 then instructs the pulse valve 6 to again discharge additional water to atmosphere and thereby generate the second instructional acoustical pulse P2. Finally, five (5) seconds after the second instructional acoustical pulse P2, the irrigation controller 8 then instructs the pulse valve 6 to again discharge additional water to the atmosphere and thereby generate the third instructional acoustical pulse P3. Then, upon receiving the alert, the first, the second and the third pulses (PA, P1, P2 and P3 of FIG. 4) and in accordance with the appropriate processes (logic flow diagram of FIG. 5A), only the microcontroller 42 of the first latching solenoid slave valve 12 activates the sprinkler heads 16 associated with the first latching solenoid slave valve 12 for a watering cycle of a total of five (5) minutes before being automatically turned off.

Figure 6:
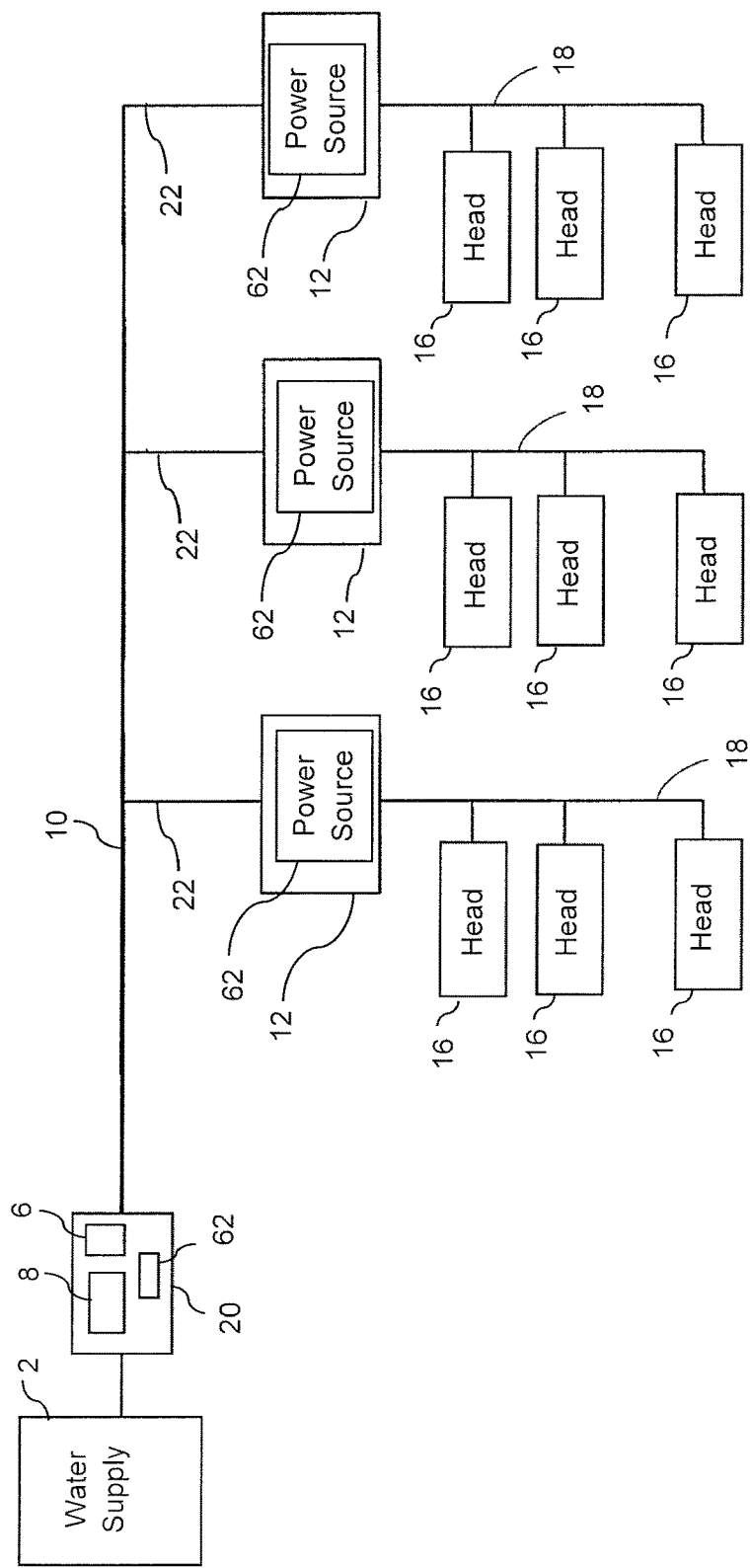
FIG. 6 is a diagrammatic drawing showing another embodiment of the improved irrigation system according to the present invention.

FIG. 6 is a diagrammatic drawing showing another embodiment of the improved irrigation system according to the present invention. According to this embodiment, the battery 48 is replaced with an alternative power source, such as a solar panel 62, which is designed to electrically power the microcontroller 42 of the respective latching solenoid slave valve 12. In all other respects, this embodiment is similar to the previous embodiments.

Figure 7:
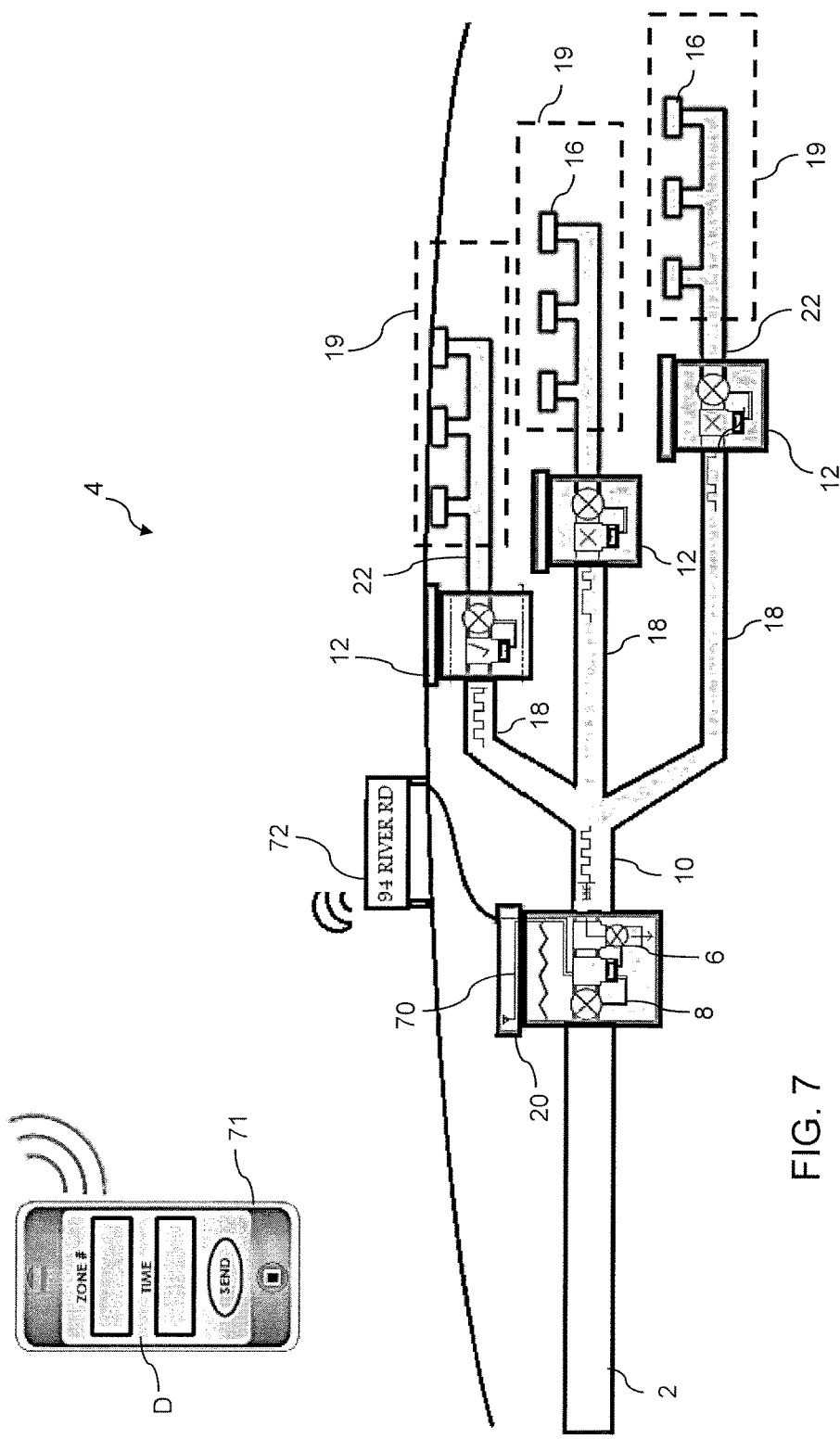
FIG. 7 is a diagrammatic drawing showing a remotely controlled irrigation system according to the present invention.

Another alternative embodiment is discussed below with reference to diagrammatical illustrations shown in FIGS. 7-7B. As with previous embodiments, the main components of the irrigation system 4 are a water supply source 2, a control box 20 with a pulser valve 6 and a controller 8, a water distribution conduit 10, at least one slave valve 12, and a plurality of sprinkler heads 16 arranged within an irrigation zone 19. The water supply source 2 is fluidly coupled, via the main control box 20, to the main water distribution conduit 10. As shown here, a first embedded antenna 70 and a possible second external antenna 72, allow the irrigation system 4 to receive instructions from a remote user interface 71.

Figure 7A:
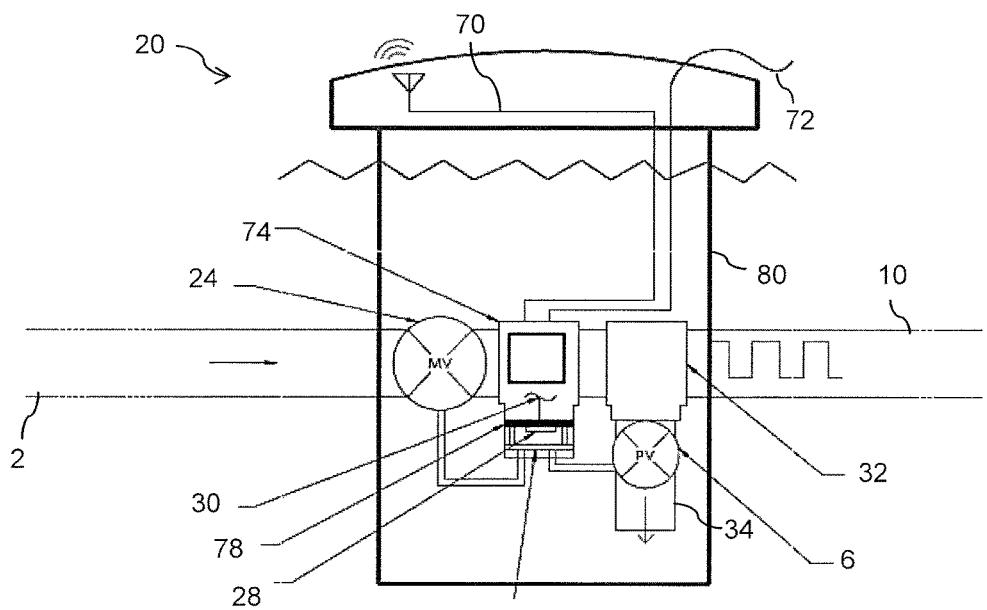
FIG. 7A is a diagrammatic illustration of a variation of an irrigation control box which is capable of being remotely controlled according to the present invention.

As shown in more detail in FIG. 7A, a first tee fitting 74 enables the battery powered printed circuit board assembly (or microprocessor) 8 to be electronically connected to at least the first embedded antenna 70, the second external antenna 72, the flow sensor 30 and the pressure sensor 28. Notice that the first tee fitting 70 as shown herein is fitted with the pressure sensor mounted to a sealed diaphragm 78 for leak detection. A waterproof enclosure 80 ensures that all the electronics are sealed inside the main control box 20.

Figure 7B:
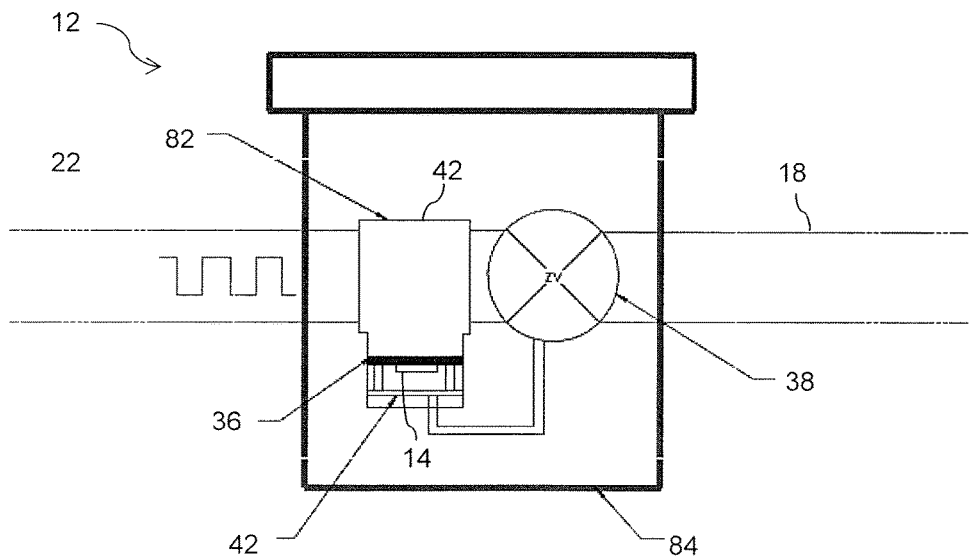
FIG. 7B is a diagrammatic illustration of a variation of the latching solenoid slave valve according to the present invention.

Similarly, as shown in more detail in FIG. 7B, a second tee fitting 82 enables the battery powered printed circuit board assembly (or microprocessor) 42 to be electronically connected to at least the sensor (e.g., the accelerometer) 14, and the driver 46 of the slave latching valve 38. Another waterproof enclosure 84 ensures that all the electronics associated with the slave valve 12 are sealed safely within.

Figure 8:
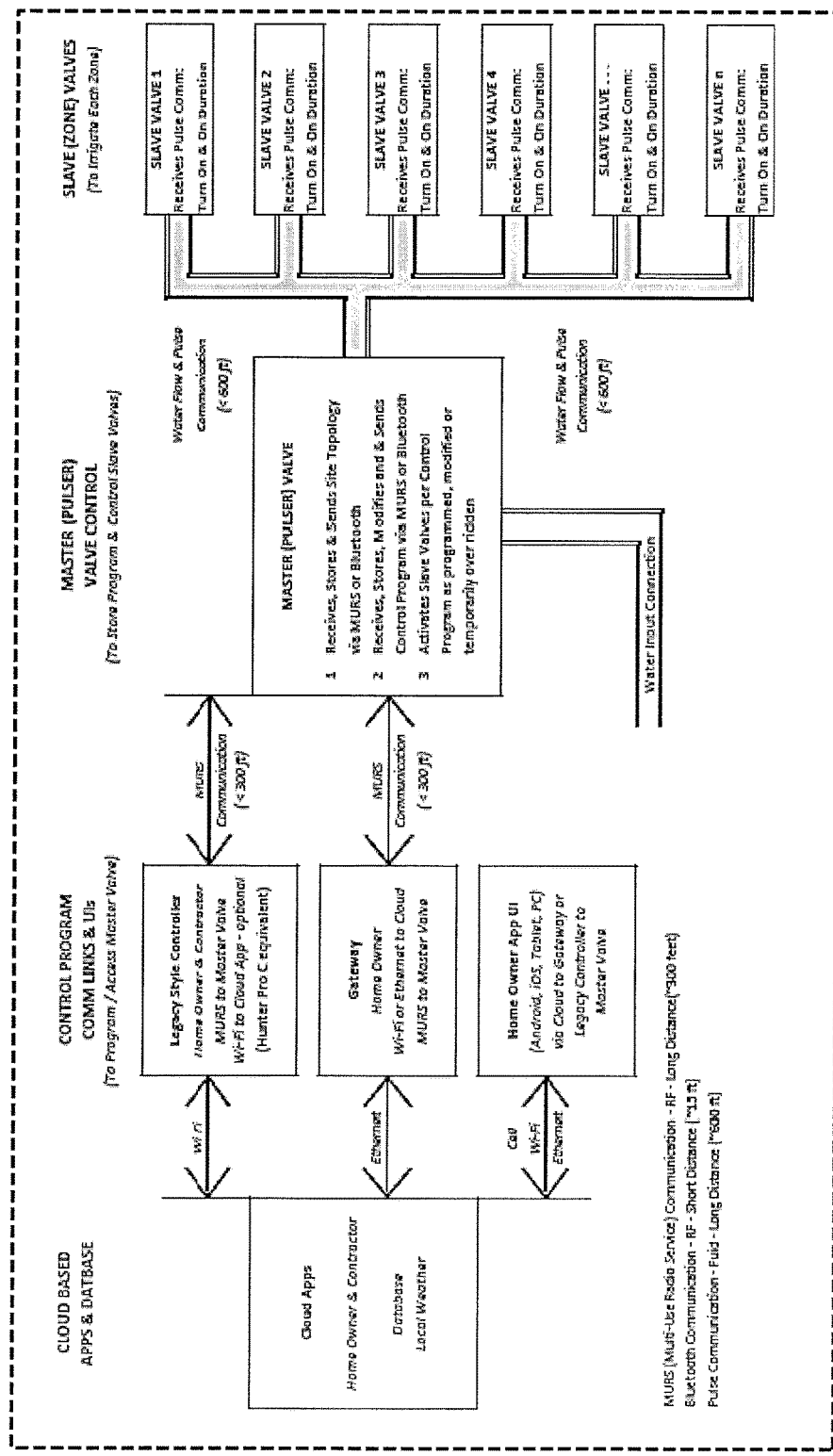
FIG. 8 diagrammatically illustrates a possible communication flow chart for the software employed with the present invention.
Figure 9:
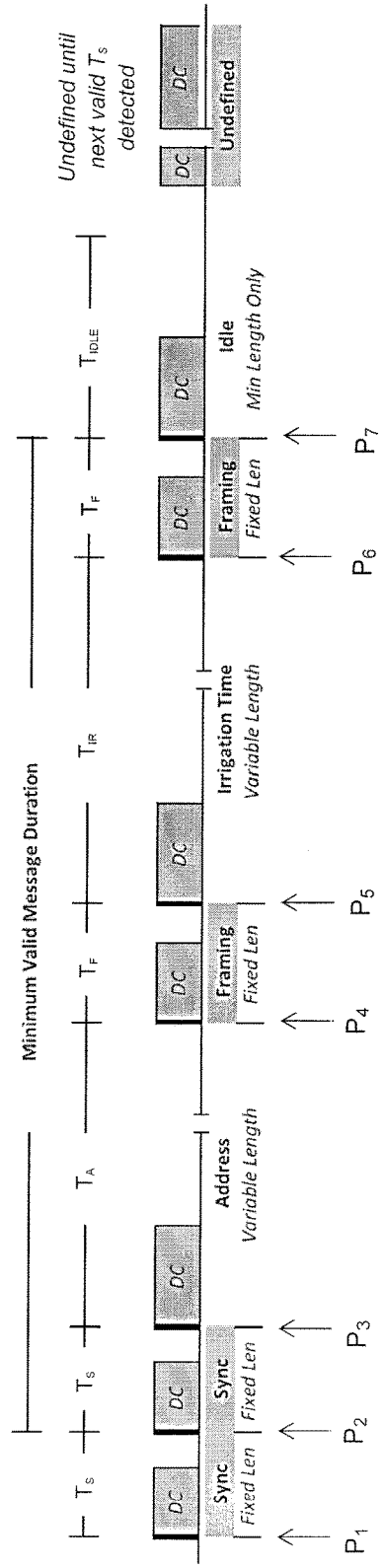
FIG. 9 diagrammatically illustrates another possible pulsing scheme for actuating a further latching solenoid slave.

A possible communication flow chart for the software employed with the present invention is diagrammatically illustrated in FIG. 8. Diagrammatically illustrated in FIG. 9 is a possible pulsing scheme for actuating a further latching solenoid slave 12 which takes into account an actual elapsed time of the pulse itself, so as to ensure that no pulse signal can overlap with another pulse signal.

Figure 10:
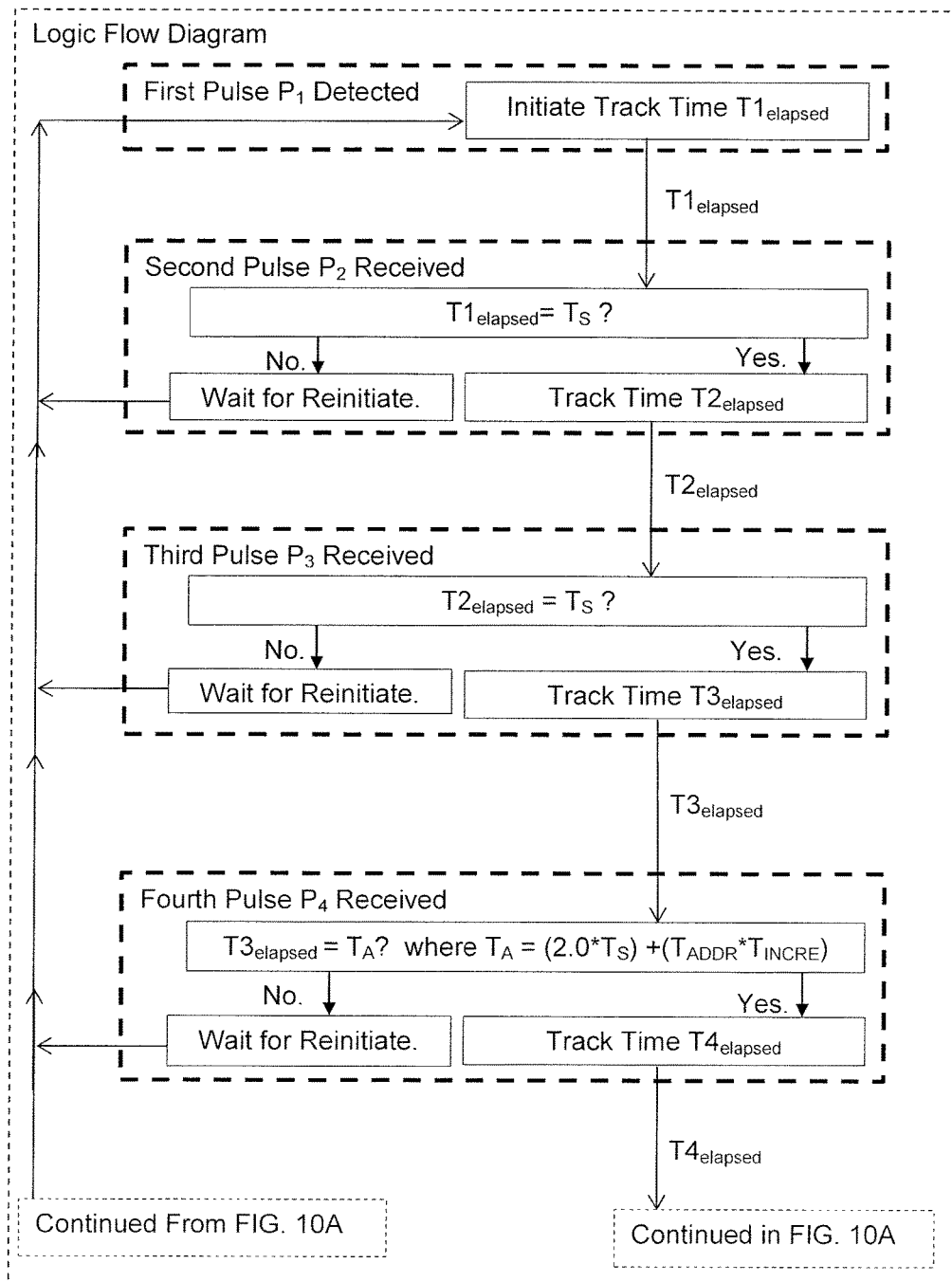
FIGS. 10 and 10A diagrammatically illustrate a possible logic flow for the software employed with the embodiment using the pulsing scheme of FIG. 9.
Figure 10A:
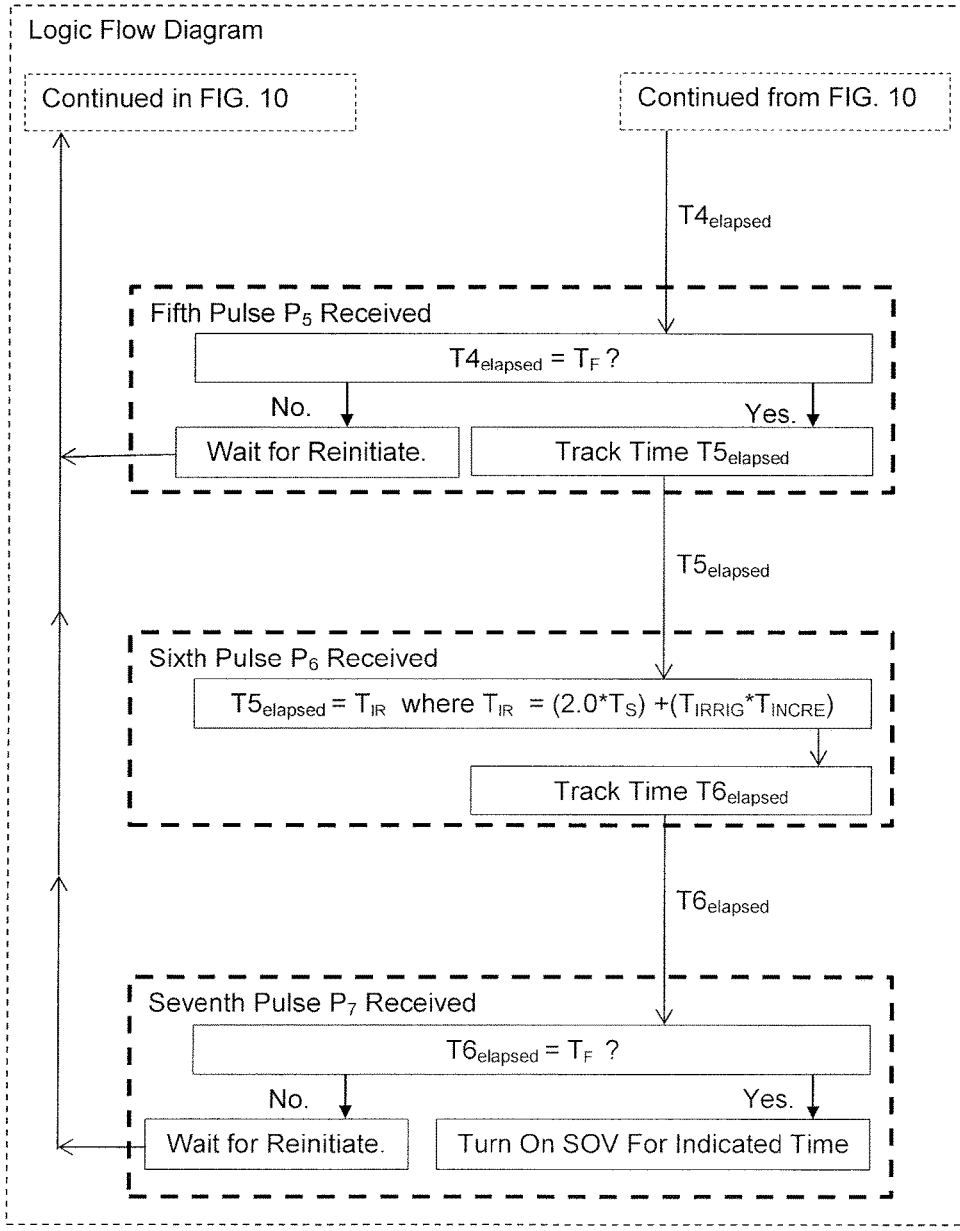

FIGS. 10 and 10A together illustrate an associated logic flow diagram for possible software of the present invention.

In the pulsing scheme shown here, the difference between an actual pulse time and the time elapsed between an initiation of a pulse $P_x$ and an initiation of a following pulse $P_y$ is illustrated. That is, each of the preprogrammed actions is associated not with a pulse per se, but with a preprogrammed time between pulses, e.g., first and second sync times $T_S$, address time $T_A$, first and second framing times $T_F$, irrigation time $T_{IR}$, and idle time $T_{IDLE}$. Each of these preprogrammed times between pulses, e.g., first and second sync times $T_S$ address time $T_A$, first and second framing times $T_F$, irrigation time $T_{IR}$, and idle time $T_{IDLE}$, are generated by the master pulse valve 6 according to a master timer. Each of these preprogrammed times between pulses, e.g., first and second sync times $T_S$, address time $T_A$, first and second framing times $T_F$, irrigation time $T_{IR}$, and idle time $T_{IDLE}$, are, in turn, measured by a respective micro-counter and/or micro-timer associated with each of the slave valves 12.

Further, each of the preprogrammed times are measured from an initiation of an associated first pulse $P_x$, as measured by a rising edge condition interpreted by the accelerometer, and an initiation of an associated second pulse $P_y$, as measured by a second rising edge condition interpreted by the accelerometer. For example, in FIG. 9, the first sync time $T_s$ is the elapsed time $T_{elapsed}$ between an initial detection of the first pulse $P_1$ and an initial detection of a second pulse $P_2$ by the accelerometer of the associated slave valve 12. After the first pulse P1 in the pulse sequence, each pulse provides two pieces of information:

1) when to stop tracking an elapsed time $T_{X\_elapsed}$, and
2) when to start tracking a new elapsed time $T_{Y\_elapsed}$.

Another feature of the scheme or pulse sequence diagrammatically illustrated in FIG. 9 is a fixed minimum elapsed $T_{MIN\_elapsed}$ between valid pulses P1, P2, P3, P4, P5, P6, P7 which is greater than a maximum actual elapsed time $T_{DC}$ of the pulse itself, according to the formula:

$$T_{MIN\_elapsed} T_{DC}$$

That is, the timer within each slave valve tracks a theoretical minimum time period $T_{DC}$ associated with an actual elapsed time between pulses. Accordingly, pulse detection of the master pulse valve 6 is disabled for at least some time period, e.g., 80% to 90% of the theoretical minimum time period $T_{DC}$. This filters out acoustic reflections and extraneous pulse noise.

For example, if a theoretical minimum time period $T_{DC}=0.9$ seconds, then a rising edge condition initiates the timer which in turn disables pulse detection by the master pulse valve 6 for at least 0.9 seconds. After 0.9 seconds, pulse detection is re-enabled. It is noted that all times generally have a tolerance of $+/-T_{TOL}$ where $T_{TOL}$ is a percentage of the minimum pulse time or pulse increment time as appropriate, e.g., 2%. Generally no assumptions may be made regarding actual high or low pulse times. However, if no secondary pulse is detected by the microcontroller of the slave valve 12 within a theoretical maximum time period $T_{MAX}$, error is assumed and the microcontroller of the slave valve 12 restarts looking for a valid pulse series.

Specifically, in the pulse scheme shown in FIG. 9, the sync time $T_s$ is a fixed time which indicates a start of a new message from the master pulse valve 6, and the sync time $T_S$ is also the minimum length of time which can occur between pulses, so that:

$$T_s = T_{MIN\_elapsed}$$

$$T_s > T_{DC}$$

In this embodiment, the master pulse valve 6 sends a minimum of two sync pulses, e.g., first and second pulses P1, P2 followed by respectively associated first and second syncing times $T_S$. Generally, the first syncing time period $T_s$ and the second syncing time period $T_s$ are equivalent and in a range of 1.0 to 5.0 seconds in increments of 0.5 seconds.

These sync pulses P1, P2 and associated sync times $T_s$ confirm the validity of the message and instructions about to be received—thereby preventing erroneous initiation of the slave valves 12 and preserving future battery life. As shown in FIG. 9, if the elapsed time after a first erroneous acoustic pulse does not equal the sync time $T_s$, the slave valve 12 rests and/or continues measuring subsequent elapsed times until a valid sync pulse series P1, P2 and associated sync times $T_s$ are detected.

Following receipt of a valid sync pulse P1, P2 having an associated sync time $T_s$, a valid pulse stream can contain either another sync pulse P2 and associated sync time $T_s$ or an initiating address pulse P3 with associated address time $T_A$. Similar to the previous embodiments then, the elapsed time $T_A$ is a variable period of time between the first instructional pulse and the second instructional pulse, e.g., the elapsed time between the third pulse P3 and the fourth pulse P4. This elapsed time, i.e., Address Time $T_A$, will indicate an address, i.e., which one of the latching solenoid slave valves 12 is to commence a watering cycle, e.g., the first latching solenoid slave valve, the second latching solenoid slave valve, the third latching solenoid slave valve. Each of the respective latching solenoid slave valves 12 is designated an address as a function of time according to the formula:

$$T_A = (T_s * 2.0) + (T_{ADDR} * T_{INCR})$$

where $T_{ADDR}$ varies in a range from $T_{ADDR1}=1$ to $T_{ADDR16}=16$, and $T_{INCR}$ is in a range of 0.25 to 2.0 seconds in increments of 0.25 seconds.

When a first microcontroller 42 is programmed with $T_s=1$ second, $T_{ADDR1}=1$, and $T_{INCR}=0.25$, and a second microcontroller 42 is programmed with $T_s=1$ second, $T_{ADDR2}=2$, and $T_{INCR}=0.25$, then:

$$T_A = (T_s * 2.0) + (T_{ADDR} * T_{INCR})$$

$$T_{A1} = (1*2.0) + (1*0.25) = 2.25 \text{ seconds}$$

$$T_{A2} = (1*2.0) + (2*0.25) = 2.50 \text{ seconds}$$

Thus according to this scheme, if the master pulser valve 6 sends a pulse pattern in which the third elapsed time $T3_{elapsed}$ between issuance of the initiating address pulse P3 and the finalizing address pulse P4 is a duration of time of 2.25 seconds, then:

$$T3_{elapsed} = 2.25 \text{ seconds}$$

$$T3_{elapsed} = T_{A1}$$

Thus the first microcontroller 42 of the first latching solenoid slave valve 12 determines that the first latching solenoid slave valve 12 is to commence a watering cycle. On the other hand, the second microcontroller 42 of the first latching solenoid slave valve 12 also determines that the second latching solenoid slave valve 12 is not to commence a watering cycle.

Contrarily, if the master pulser valve 6 sends a pulse pattern in which the third elapsed time $T3_{elapsed}$ between issuance of the initiating address pulse P3 and the finalizing address pulse P4 is a duration of time of 2.50 seconds, then:

$$T3_{elapsed} = 2.50 \text{ seconds}$$

$$T3_{elapsed} = T_{A2}$$

Thus the first microcontroller 42 of the first latching solenoid slave valve 12 determines that the first latching solenoid slave valve 12 is not to commence a watering cycle. On the other hand, the second microcontroller 42 of the first latching solenoid slave valve 12 also determines that the second latching solenoid slave valve 12 is to commence a watering cycle.

Unlike the pulse pattern shown in FIGS. 4-4B though the finalizing address pulse P4 is followed by a framing pulse $P_F$ which confirms the validity of the message and instructions received thereby preventing erroneous initiation of an incorrectly identified slave valve 12 and also preserving future battery life. That is, by providing a framing pulse after a preset framing time $T_F$ the present pulse scheme prevents erroneous acoustic signals received after the initiating address pulse P3 from incorrectly triggering an incorrectly identified slave valve 12. As seen in FIG. 9, if the elapsed time $T4_{elapsed}$, $T6_{elapsed}$ after an erroneous ending acoustic pulse does not equal the preset framing time $T_F$, the slave valve 12 rests and/or continues measuring subsequent elapsed times until a complete valid sync pulse series is detected.

Once the irrigation controller 8 sends the appropriate framing pulse P5 to the latching solenoid slave valves 12, the irrigation controller 8 then sends further instructions concerning the duration of time that the desired latching solenoid slave valve 12 is to operate. In the pulsing scheme of FIG. 9, this is achieved by the irrigation controller 8 instructing the pulse valve 6 to generate a sixth pulse P6 after an irrigation time $T_{IR}$. Each of the respective latching solenoid slave valves 12 is preprogrammed with a series of irrigation time periods as a function of time according to the formula:

$$T_{IR} = (T_s * 2.0) + (T_{IRRIG} * T_{INCR})$$

where $T_{IRRIG}$ varies in a range from $T_{IRRIG1}=1$, associated with a first minimum preset programmed running irrigation time, to $T_{IRRIG1}=120$, associated with a final maximum preset programmed running irrigation time, and $T_{INCR}$ is in a range of 0.25 to 2.0 seconds in increments of 0.25 seconds.

Thus, when a first microcontroller 42 is programmed with $T_s=1$ second, $T_{IRRIG1}=1$, $T_{IRRIG2}=2$, and $T_{INCR}=0.25$, then:

$$T_{IR} = (T_s * 2.0) + (T_{IRRIG} * T_{INCR})$$

$$T_{IR1} = (1*2.0) + (1*0.25) = 3.25 \text{ seconds}$$

$$T_{IR2} = (1*2.0) + (2*0.25) = 3.50 \text{ seconds}$$

Thus according to this scheme, if the master pulser valve 6 sends a pulse pattern in which the fifth elapsed time $T5_{elapsed}$ between issuance of the initiating irrigation pulse P5 and the finalizing irrigation pulse P6 is a duration of time of 3.25 seconds, then:

$$T5_{elapsed} = 3.25 \text{ seconds}$$

$$T5_{elapsed} = T_{IR1}$$

Thus the microcontroller 42 of the previously identified latching solenoid slave valve 12 determines that the watering cycle is to commence for a first minimum preset programmed running irrigation time.

Alternatively, if the master pulser valve 6 sends a pulse pattern in which the fifth elapsed time $T5_{elapsed}$ between issuance of the initiating irrigation pulse P5 and the finalizing irrigation pulse P6 is a duration of time of 3.50 seconds, then:

$T5_{elapsed}$=3.50 seconds $T5_{elapsed}=T_{IR2}$

Thus the microcontroller 42 of the previously identified latching solenoid slave valve 12 determines that the watering cycle is to commence for a second preset programmed running irrigation time.

However, again, unlike the pulse pattern shown in FIGS. 4-4B, the finalizing irrigation pulse P6 is followed by respective framing pulses $P_F$ which assist and confirm the validity of the message and instructions received thereby preventing erroneous initiation of the slave valves 12 and preserving future battery life. This prevents erroneous acoustic signals received after the initiating irrigation pulse P5 from triggering the identified slave valve 12 for an incorrect time period. As before and seen in FIG. 9, if the elapsed time $T6_{elapsed}$ after an erroneous ending acoustic pulse does not equal the preset framing time $T_F$, the slave valve 12 rests and/or continues measuring subsequent elapsed times until a complete valid sync pulse series is detected. Only upon receipt of a final framing pulse p7 after a preset framing time $T_F$ will the microcontroller 42 signal the driver and the respective slave latching valve 38 of the latching solenoid slave valve 12 to begin irrigation of an irrigation zone 19. Thereafter the indicated irrigation time, the respective microcontroller 42 will automatically shut off the respective slave latching valve 38 of the latching solenoid slave valve 12.

It is to be appreciated that either longer or shorter time intervals e.g., first and second sync times $T_S$, address time $T_A$, first and second framing times $T_F$, irrigation time $T_{IR}$, and the idle time $T_{IDLE}$, or alternative coding patterns altogether, may be utilized to transmit the desired operating time of a desired slave latching valve 12 without departing from the spirit and scope of the present invention.

In the above description and appended drawings, it is to be appreciated that only the terms "consisting of" and "consisting only of" are to be construed in the limitative sense while of all other terms are to be construed as being open-ended and given the broadest possible meaning.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Wherefore, we claim:

1. An irrigation system for wirelessly sending encoded acoustical messages along a main water distribution conduit for controlling irrigation, the irrigation system comprising: an acoustical pulse generator being connected to the main water distribution conduit for generating acoustical waves or pulses in the main water distribution conduit, an irrigation controller being electrically coupled to the acoustical pulse generator for controlling generation of first and second pairs of the acoustical waves or pulses, the main water distribution conduit being connected to at least first and second irrigation zones, via a respective slave valve, for supplying water to each of the first and the second irrigation zones, each of the first and the second irrigation zones comprising a zone distribution conduit and a plurality of water distribution heads, the each respective slave valve having an acoustical receiver arranged to receive the first and second pairs of the acoustical waves or pulses generated by the irrigation controller and control actuation of the respective slave valve based on the received acoustical waves or pulses and facilitate water flow along the respective zone distribution conduit from the main water distribution conduit to the associated plurality of water distribution heads, the first pair of waves or pulses forming a command indicating which of the at least two slave valves is to commence a watering operating and the second pair of waves or pulses forming a command indicating how long that slave valve one of the two slave valves is to water during the watering operation, and during the watering operation, each of the acoustical receivers of the first and the second irrigation zones always receiving at least the first and the second pairs of acoustical waves or pulses.

2. The irrigation system according to claim 1, wherein the irrigation controller wirelessly communicates watering instructions to the respective slave valves of the first and the second irrigation zones, each of the respective slave valves has latching solenoid slave valve which controls irrigation of the irrigation system based on the watering instructions from the irrigation controller, the irrigation system comprising:
the irrigation controller being wirelessly coupled to the plurality of latching solenoid slave valves, via the main water distribution conduit, for selectively sending watering instructions to a desired one of the plurality of latching solenoid slave valves, the irrigation controller being electrically coupled to a pulser valve for controlling operation of the pulser valve and generating the acoustical waves or pulses, in pressurized water when contained within the main water distribution conduit, for instructing a selective one of the plurality of latching solenoid slave valves to commence a watering cycle for a desired duration of time;
each one of the acoustical receivers comprising a diaphragm directly communicating with pressurized water, contained within the main water distribution conduit of the irrigation system, for always detecting the acoustical waves or pulses transmitted by the pressurized water; a respective accelerometer being supported by an opposite surface of the diaphragm for generating an output signal as the respective diaphragm vibrates due to detection of the acoustical waves or pulses in the pressurized water; and a respective microcontroller being electrically coupled to the respective accelerometer for processing of each output signal of the respective accelerometer, and the respective microcontroller determining, from the processed output signals of the respective accelerometer whether or not the respective latching solenoid slave valve is to commence the watering cycle for the desired duration of time.

3. The irrigation system according to claim 2, wherein a respective driver electrically couples the respective microcontroller to a respective slave latching valve of the respective latching solenoid slave valve, and the respective driver sends a control signal to the respective slave latching valve for controlling opening and closing thereof, and a respective amplifier electrically couples the respective accelerometer to the respective microcontroller, and the respective amplifier amplifies the output signal of the respective accelerometer which is supplied to the respective microcontroller.

4. The irrigation system according to claim 3, wherein each of the respective drivers transmits a 200-500 milliamp output signal to the respective slave latching valve of the respective latching solenoid slave valve for either opening or closing the respective slave latching valve.

5. The irrigation system according to claim 2, wherein the two pair of acoustical waves or pulses comprises a series of three acoustical waves or pulses which initiate transmission of operating instructions that indicate which one of the plurality of latching solenoid slave valves is to commence the watering cycle, a duration of time between the first acoustical wave or pulse and the second acoustical wave or pulse indicating which one of the plurality of latching solenoid slave valves is to commence a watering cycle, and a duration of time between the second acoustical wave or pulse and the third acoustical wave or pulse indicating a duration of the watering cycle.

6. The irrigation system according to claim 5, wherein an alert acoustical wave or pulse proceeds the series of three acoustical waves or pulses which initiate transmission of the operating instructions, and the alert acoustical wave or pulse notifies each one of the respective microcontrollers, of each respective latching solenoid slave valve, to be ready to receive the operating instructions from the irrigation controller and assists each one of the respective microcontrollers with deciphering noise from actual instruction commands from the irrigation controller.

7. The irrigation system according to claim 2, wherein once the watering cycle commences, all remaining microcontrollers, of each one of the plurality of non-activated latching solenoid slave valves, enters into a dormant state for a period of time that exceeds the instructed watering cycle of a currently operating latching solenoid slave valve, where each one of the respective microcontrollers ignore all acoustical waves or pulses that the respective diaphragms and the respective accelerometers may receive to allow for completion of the watering cycle and permit time for the irrigation system to again stabilize.

8. The irrigation system according to claim 2, wherein each of the plurality of latching solenoid slave valves is powered by a respective battery, and at least the respective diaphragm and the respective accelerometer are housed within a respective enclosure which permits the respective diaphragm and the respective accelerometer to be buried underground and facilitate vibration of the respective diaphragm and movement of the respective accelerometer without hindrance from the ground.

9. The irrigation system according to claim 2, wherein the main water distribution conduit comprises a plurality of legs, and each one of the plurality of legs terminates at one of the plurality of latching solenoid slave valves, a respective one of the plurality of latching solenoid slave valve separates the main water distribution conduit from the respective zone distribution conduit, each of the respective zone distribution conduits has a plurality of spaced apart sprinkler heads, and a respective one of the plurality of latching solenoid slave valves controls water flow to the plurality of spaced apart sprinkler heads.

10. An irrigation system for wirelessly sending encoded acoustical messages in a main water distribution conduit for controlling irrigation processes, the irrigation system comprising: an acoustical pulse generator being connected to the main water distribution conduit, the acoustical pulse generator generating acoustical waves or pulses in the main water distribution conduit; an irrigation controller being electrically coupled to the acoustical pulse generator to control the generation of two pair of the acoustical waves or pulses; the main water distribution conduit being connected to at least first and second irrigation zones for supplying water to each of the first and the second irrigation zones; each of the first and the second irrigation zones comprising a microcontroller that is connected to an acoustical receiver and a latching solenoid slave valve, the acoustical receiver being arranged to receive the two pair of the acoustical waves or pulses generated by the acoustical pulse generator, and the latching solenoid slave valve being actuatable by the microcontroller based on the two pair of the acoustical waves or pulses received by the acoustical receiver for controlling water flow from the main water distribution conduit to a zone distribution conduit and a plurality of water distribution heads of the respective first and the second irrigation zone; the microcontroller of the first irrigation zone comprises a first identification number and the microcontroller of the second irrigation zone comprises a second identification number; the two pair of the acoustical waves or pulses comprising at least first, second and third acoustical waves or pulses, the first and the second signals defining an identification code, and the second and the third signals defining a duration of time; and the microcontroller of both the respective first and the second irrigation zones, processing at least the first and the second acoustical waves or pulses to consider the identification code defined by the first and the second acoustical waves or pulses to determine which of the first and the second irrigation zones is to commence a watering operation; if the identification code defined by the first and the second acoustical waves or pulses corresponds to the first identification number, the latching solenoid slave valve of the first irrigation zone being activated to open for the duration of time defined by the second and the third acoustical waves or pulses, and the latching solenoid slave valve of the second irrigation zone remaining deactivated, and if the identification code defined by the first and the second acoustical waves or pulses corresponds to the second identification number, the latching solenoid slave valve of the second irrigation zone being activated to open for the duration of time defined by the second and the third acoustical waves or pulses, and the latching solenoid slave valve of the first irrigation zone remaining deactivated.

11. The irrigation system according to claim 10, wherein the microcontroller of both the respective first and the second irrigation zones, processing the second and the third acoustical waves or pulses to determine the duration of time of which the actuated latching solenoid slave valve is to remain activated, and the microcontroller associated with the unactuated latching solenoid slave valve entering a dormant state for a period of time that exceeds the duration of time defined by the second and the third acoustical waves or pulses.

12. The irrigation system according to claim 10, wherein the identification code is defined based on a span of time between generation of the first acoustical wave or pulse and generation of the second acoustical wave or pulse, and a span of time between the generation of the second acoustical wave or pulse and generation of the third acoustical wave or pulse defines the duration of time of which the actuated latching solenoid slave valve is to remain open.

13. The irrigation system according to claim 10, wherein the acoustical pulse generator being a pulser valve which is electrically coupled to the irrigation controller for controlling operation of the pulser valve and generating the two pair of acoustical waves or pulses, the pulser valve generating the first, the second and the third acoustical waves or pulses based on a respective sole electrical pulse transmitted by the irrigation controller to the pulser valve.

14. The irrigation system according to claim 10, wherein the acoustical receivers of the respective first and the second irrigation zones each comprising a diaphragm and an accelerometer, the diaphragm having one surface directly communicating with pressurized water, contained within the main water distribution conduit of the irrigation system, for always detecting the acoustical waves or pulses transmitted by the pressurized water, and the accelerometer being supported by an opposite surface of the diaphragm for generating an output signal as the diaphragm vibrates due to detection of the acoustical waves or pulses in the pressurized water, and the microcontrollers of the first and the second irrigation zones each being electrically coupled to the respective accelerometer for processing of each output signal of the respective accelerometer, and the respective microcontroller determining, from the processed output signals of the respective accelerometer whether or not the respective latching solenoid slave valve is to open for the duration of time.

15. The irrigation system according to claim 13, wherein the pulser valve is actuatable to open and closed conditions, in the open condition pressurized water is permitted to flow from the main water distribution conduit through the pulser valve to atmosphere, and in the closed condition the pressurized water is prevented to flow from the main water distribution conduit through the pulser valve to the atmosphere and in the closed condition, and each one of the first, the second and the third acoustical waves or pulses being generated by the pulser valve switching from the closed condition to the open condition and back to the closed condition based on a single electrical pulse issued by the irrigation controller.

* * * * *